United States Patent
Bolotin et al.

(10) Patent No.: US 10,503,665 B2
(45) Date of Patent: Dec. 10, 2019

(54) MEMORY LOCK SYSTEM WITH MANIPULATABLE INPUT DEVICE AND METHOD OF OPERATION THEREOF

(71) Applicant: ClevX, LLC, Kirkland, WA (US)

(72) Inventors: Lev M. Bolotin, Kirkland, WA (US); Simon B. Johnson, Bonney Lake, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

(21) Appl. No.: 14/719,185

(22) Filed: May 21, 2015

(65) Prior Publication Data
US 2015/0281205 A1   Oct. 1, 2015

Related U.S. Application Data

(63) Continuation of application No. 11/996,501, filed as application No. PCT/US2006/028479 on Jul. 20, 2006, now Pat. No. 9,075,571.

(60) Provisional application No. 60/595,631, filed on Jul. 21, 2005.

(51) Int. Cl.
*G06F 12/14* (2006.01)
*G06F 21/60* (2013.01)
(Continued)

(52) U.S. Cl.
CPC ........ *G06F 12/1466* (2013.01); *G06F 1/1632* (2013.01); *G06F 1/266* (2013.01);
(Continued)

(58) Field of Classification Search
CPC ..... G06F 12/14–1491; G06F 21/34–35; G06F 21/45; G06F 21/606; G06F 21/79
(Continued)

(56) References Cited

U.S. PATENT DOCUMENTS 5,479,341 A    12/1995  Pihl et al.
5,623,637 A *  4/1997   Jones .................. G06F 12/1466
                                                             710/13
(Continued)

FOREIGN PATENT DOCUMENTS

CN    2736827 Y    10/2005
EP    1372080 A1   12/2003
(Continued)

OTHER PUBLICATIONS

Jeff Fila. "APC Biometric Password Manager Review." Apr. 2004. http://www.digitaltrends.com/pc-accessory-reviews/apc-biometric-password-manager-review/.*
(Continued)

*Primary Examiner* — Nathan Sadler
(74) *Attorney, Agent, or Firm* — Schwegman Lundberg & Woessner, P.A.

(57) ABSTRACT

An authentication system and method of operation thereof includes: an input device for receiving a login credential for inputting into a memory lock system; a controller for detecting a communication channel from the memory lock system to an electronic system; a locking function controller for setting an unlocked status to a memory of the memory lock system based on the login credential; a transfer function controller for providing authentication information from the memory based on the unlocked status; and wherein: the controller is for enabling an access to an account based on the communication channel and based on the authentication information.

21 Claims, 14 Drawing Sheets

(51) Int. Cl.

| | | |
|---|---|---|
| G06F 3/0362 | (2013.01) | |
| G06F 21/62 | (2013.01) | |
| G06F 21/79 | (2013.01) | |
| G06F 21/44 | (2013.01) | |
| G06F 1/16 | (2006.01) | |
| G06F 1/26 | (2006.01) | |
| G06F 13/28 | (2006.01) | |
| G06F 13/42 | (2006.01) | |
| H04L 29/06 | (2006.01) | |

(52) U.S. Cl.
CPC .......... *G06F 3/0362* (2013.01); *G06F 13/28* (2013.01); *G06F 13/4282* (2013.01); *G06F 21/44* (2013.01); *G06F 21/606* (2013.01); *G06F 21/6245* (2013.01); *G06F 21/79* (2013.01); *H04L 63/08* (2013.01); *G06F 2212/1052* (2013.01)

(58) Field of Classification Search
USPC .......................... 711/115, 163–164; 726/19
See application file for complete search history.

(56) References Cited

U.S. PATENT DOCUMENTS

| 5,841,361 | A | 11/1998 | Hoffman |
|---|---|---|---|
| 5,974,513 | A | 10/1999 | Matsuo et al. |
| 6,067,621 | A | 5/2000 | Yu et al. |
| 6,237,100 | B1 | 5/2001 | Cromer et al. |
| 6,324,537 | B1 | 11/2001 | Moran |
| 6,547,130 | B1 | 4/2003 | Shen |
| 6,857,076 | B1 | 2/2005 | Klein |
| 6,904,493 | B2 | 6/2005 | Chiao et al. |
| 7,069,447 | B1 | 6/2006 | Corder |
| 7,117,369 | B1 * | 10/2006 | Burns ................ G06F 21/34 713/168 |
| 7,120,251 | B1 | 10/2006 | Kawada et al. |
| 7,228,438 | B2 | 6/2007 | Bushmitch et al. |
| 7,257,714 | B1 | 8/2007 | Shen |
| 7,260,726 | B1 | 8/2007 | Doe et al. |
| 7,272,723 | B1 | 9/2007 | Abbott et al. |
| 7,376,831 | B2 | 5/2008 | Kollmyer et al. |
| 7,469,302 | B2 | 12/2008 | Whittle et al. |
| 7,536,548 | B1 | 5/2009 | Batke et al. |
| 7,631,195 | B1 | 12/2009 | Yu et al. |
| 8,266,378 | B1 | 9/2012 | Jevans et al. |
| 8,832,440 | B2 | 9/2014 | Johnson et al. |
| 8,843,768 | B2 | 9/2014 | Vogel |
| 8,972,741 | B2 * | 3/2015 | Awatsu ................ G06F 21/32 713/186 |
| 9,075,571 | B2 | 7/2015 | Bolotin et al. |
| 9,262,611 | B2 | 2/2016 | Johnson et al. |
| 10,025,729 | B2 | 7/2018 | Bolotin et al. |
| 10,083,130 | B2 | 9/2018 | Bolotin et al. |
| 2001/0008015 | A1 | 7/2001 | Vu et al. |
| 2001/0016895 | A1 | 8/2001 | Sakajiri et al. |
| 2001/0036109 | A1 | 11/2001 | Jha et al. |
| 2001/0056539 | A1 | 12/2001 | Pavlin et al. |
| 2002/0010827 | A1 | 1/2002 | Cheng |
| 2002/0078361 | A1 | 6/2002 | Giroux et al. |
| 2002/0112168 | A1 | 8/2002 | Filipi-Martin et al. |
| 2003/0005336 | A1 | 1/2003 | Poo et al. |
| 2003/0046567 | A1 * | 3/2003 | Carman ................ G06F 21/34 713/193 |
| 2003/0046593 | A1 | 3/2003 | Xie et al. |
| 2003/0128101 | A1 | 7/2003 | Long |
| 2004/0059907 | A1 | 3/2004 | Cochran et al. |
| 2004/0064708 | A1 * | 4/2004 | Angelo ................ G06F 21/45 713/185 |
| 2004/0088574 | A1 | 5/2004 | Walter et al. |
| 2004/0236919 | A1 | 11/2004 | Okaue et al. |
| 2004/0268074 | A1 | 12/2004 | Yagi |
| 2005/0027997 | A1 | 2/2005 | Ueno et al. |
| 2005/0039027 | A1 | 2/2005 | Shapiro |
| 2005/0050367 | A1 | 3/2005 | Burger et al. |
| 2005/0086497 | A1 | 4/2005 | Nakayama |
| 2005/0097338 | A1 * | 5/2005 | Lee ................ G06F 21/32 713/186 |
| 2005/0138390 | A1 * | 6/2005 | Adams ................ G06F 1/1626 713/185 |
| 2005/0144464 | A1 * | 6/2005 | Chiu ................ G06F 21/32 713/186 |
| 2005/0182971 | A1 | 8/2005 | Ong et al. |
| 2005/0182973 | A1 | 8/2005 | Funahashi et al. |
| 2006/0036872 | A1 | 2/2006 | Yen |
| 2006/0064604 | A1 | 3/2006 | Osaki |
| 2006/0176146 | A1 * | 8/2006 | Krishan ................ G06F 21/32 340/5.53 |
| 2006/0198515 | A1 | 9/2006 | Forehand et al. |
| 2006/0204047 | A1 | 9/2006 | Dave et al. |
| 2006/0242693 | A1 | 10/2006 | Kussmaul |
| 2007/0011724 | A1 * | 1/2007 | Gonzalez ................ G06F 21/31 726/4 |
| 2007/0016743 | A1 | 1/2007 | Jevans |
| 2007/0061894 | A1 | 3/2007 | Skinner et al. |
| 2007/0083973 | A1 | 4/2007 | Fruhauf et al. |
| 2007/0112981 | A1 | 5/2007 | Hernandez |
| 2007/0113276 | A1 | 5/2007 | Shoji et al. |
| 2007/0118745 | A1 | 5/2007 | Buer |
| 2007/0118891 | A1 | 5/2007 | Buer |
| 2007/0162962 | A1 | 7/2007 | Baum et al. |
| 2007/0169200 | A1 | 7/2007 | Wang et al. |
| 2007/0180270 | A1 | 8/2007 | Kumagai et al. |
| 2007/0258585 | A1 | 11/2007 | Sandhu et al. |
| 2007/0258594 | A1 | 11/2007 | Sandhu et al. |
| 2008/0005409 | A1 | 1/2008 | Kolokowsky et al. |
| 2008/0126813 | A1 | 5/2008 | Kawakami |
| 2008/0130959 | A1 | 6/2008 | Kim |
| 2008/0209224 | A1 | 8/2008 | Lord |
| 2008/0219449 | A1 | 9/2008 | Ball et al. |
| 2008/0229118 | A1 | 9/2008 | Kasako et al. |
| 2009/0006863 | A1 | 1/2009 | Mizuno |
| 2009/0097653 | A1 | 4/2009 | Dahlerud |
| 2009/0125726 | A1 | 5/2009 | Iyer et al. |
| 2009/0144361 | A1 | 6/2009 | Nobakht et al. |
| 2009/0199004 | A1 | 8/2009 | Krawczewicz et al. |
| 2009/0220088 | A1 | 9/2009 | Lu et al. |
| 2010/0049993 | A1 | 2/2010 | Okaue et al. |
| 2010/0174913 | A1 | 7/2010 | Johnson et al. |
| 2010/0174922 | A1 | 7/2010 | Johnson et al. |
| 2010/0199334 | A1 * | 8/2010 | Ehrensvard ................ G06F 21/34 726/5 |
| 2010/0235575 | A1 | 9/2010 | Yasaki et al. |
| 2011/0060921 | A1 | 3/2011 | Michael |
| 2011/0113255 | A1 | 5/2011 | Kuster et al. |
| 2011/0307724 | A1 | 12/2011 | Shaw et al. |
| 2011/0314279 | A1 | 12/2011 | Ureche et al. |
| 2015/0278124 | A1 | 10/2015 | Bolotin et al. |
| 2015/0278125 | A1 | 10/2015 | Bolotin et al. |
| 2016/0119339 | A1 | 4/2016 | Bolotin et al. |
| 2016/0259736 | A1 | 9/2016 | Bolotin et al. |

FOREIGN PATENT DOCUMENTS

| EP | 1657645 A1 | 5/2006 |
|---|---|---|
| EP | 1982262 A1 | 8/2007 |
| JP | 2004070467 A | 3/2004 |
| JP | 2004086584 A | 3/2004 |
| KR | 20050119751 A | 12/2005 |
| TW | I235329 | 7/2005 |
| WO | 0042491 A1 | 7/2000 |
| WO | 2005017758 A1 | 2/2005 |
| WO | WO-2007014074 A1 | 2/2007 |
| WO | WO-2007087340 A1 | 8/2007 |

OTHER PUBLICATIONS

Sarah Granger. "The Simplest Security: A Guide to Better Password Practices." Jan. 2002. http://web.archive.org/web/20020123134242/http://www.securityfocus.com/infocus/1537.*

U.S. Appl. No. 14/718,741, filed May 21, 2015, Bolotin et al.

(56) References Cited

OTHER PUBLICATIONS

U.S. Appl. No. 14/719,205, filed May 21, 2015, Bolotin et al.
Ali Ahmed, "Corsair Flash Padlock", "http://smartguy31.blogspot.com/2008/08/corsair-flash-padlock.html", Aug. 25, 2008, p. 1, Technology & Innovation.
Arnold, "Embedded Controller Hardware Design", 2001, p. 4, Publisher: LLH Technology Publishing.
Breeden et al., "The 11 best products of 2011", "http://gcn.com/Articles/2011/11/07/11-best-products-of-2011.aspx?Page=1", Nov. 4, 2011, p. 2, GCN: Technology, Tools and TActics for Public Sector IT.
Convery, "Network Security Architectures", "ProQuest Tech Books", Apr. 19, 2004, p. 12, Cisco Press, Safari. Books Online.
Crowe, "At last, a key drive the government can love", "http://gcn.com/Articles/2011/09/05/Review-of-the-LOK-IT-SDG003FM-4GB.aspx", Sep. 1, 2011, p. 2, GCN: Technology, Tools and TActics for Public Sector IT.
Datashur, "Finally, the arrival of an ultra-secure, easy to use and affordable USB Flash Drive", "http://www.istorage-uk.com/datashur.php", 2014, p. 2.
Goodwin, "A new take on securing USB flash drives", "http://www.gsnmagazine.com/node/24951", Nov. 9, 2011, p. 2, Government Security News.
IEEE, "Authoritative Dictionary of IEEE Standards Terms", "Authoritative Dictionary of IEEE Standards Terms", Dec. 2000, pp. 219-221, vol. 7th ed, IEEE.
Wolf, "LOK-IT Secure Flash Drive", "http://www.lok-it.net/secure-flash-drive-government/", 2014, p. 5, Systematic Development Group.
Merriam-Webster, "Merriam-Webster.com/Dictionary", 2013, p. 4, www.merriam-webster.com/dictionary/manipulate.
Biersdorfer, "Keeping Pocket-Size Data Under Lock and Key", "The New York Times", Aug. 30, 2007, p. 1, The New York Times Company, NY, USA.
O'Brien et al., "7 secure USB drives", Mar. 3, 2008, p. 13, Computerworld.
Oprah, "The O List: Sep. 2008, 6 of 9—Better Safe Than Sorry", "http://www.oprah.com/omagazine/The-O-List-September-2008/6", Sep. 2008, p. 1, O, The Oprah Magazine.
Cisco Cheng, "Corsair Launches Secure and Rugged Flash Drives", Sep. 19, 2007, PC Magazine, Published in: http://www.pcmag.com/article2/0,2817,2185166,00.asp.
Rubenking, "Aegis Secure Key", "http://www.pcmag.com/article2/0,2817,2397935,00.asp, Aegis Secure Key Review & Rating", Dec. 21, 2011, p. 2. PCMag.com.
Sandisk, "Sandisk Introduces TriFlash, a High Capacity Small-Size Embedded Flash Memory Device", "Business Wire", Nov. 13, 2000, p. 6, The Free Library.
Schneier, "Schneier on Security: Crypto Implementation Failure", Mar. 4, 2010, p. 42, Volume blog.
Vochin, "Corsair Rolls Out the Flash Padlock USB Flash Drives with Touch-Pad and Security PIN Entry System", "http://news.softpedia.com/news/Corsair-Rolls-Out-the-Flash-Padlock-USB-Flash-Drives-with-Touch-Pad-Security-PIN-Entry-System-62986.shtml", Aug. 17, 2007, p. 1, Softpedia.
"U.S. Appl. No. 11/996,501, 312 Amendment filed Apr. 30, 2015", 8 pgs.
"U.S. Appl. No. 11/996,501, 312 Amendment filed May 26, 2015", 3 pgs.
"U.S. Appl. No. 11/996,501, Advisory Action dated Jan. 8, 2014", 3 pgs.
"U.S. Appl. No. 11/996,501, Advisory Action dated Jan. 25, 2011", 3 pgs.
"U.S. Appl. No. 11/996,501, Advisory Action dated Jul. 8, 2014", 3 pgs.
"U.S. Appl. No. 11/996,501, Advisory Action dated Aug. 6, 2012", 3 pgs.
"U.S. Appl. No. 11/996,501, Appeal Brief filed May 5, 2011", 32 pgs.
"U.S. Appl. No. 11/996,501, Examiner Interview Summary dated Apr. 8, 2014", 3 pgs.
"U.S. Appl. No. 11/996,501, Examiner's Answer to Appeal Brief dated Jun. 3, 2011", 20 pgs.
"U.S. Appl. No. 11/996,501, Final Office Action dated Apr. 25, 2014", 14 pgs.
"U.S. Appl. No. 11/996,501, Final Office Action dated May 31, 2012".
"U.S. Appl. No. 11/996,501, Final Office Action dated Oct. 29, 2013", 14 pgs.
"U.S. Appl. No. 11/996,501, Final Office Action dated Nov. 15, 2010", 15 pgs.
"U.S. Appl. No. 11/996,501, Non Final Office Action dated Jan. 24, 2012", 14 pgs.
"U.S. Appl. No. 11/996,501, Non Final Office Action dated Mar. 27, 2014", 15 pgs.
"U.S. Appl. No. 11/996,501, Non Final Office Action dated Jun. 26, 2013", 14 pgs.
"U.S. Appl. No. 11/996,501, Non Final Office Action dated Jun. 29, 2010", 13 pgs.
"U.S. Appl. No. 11/996,501, Notice of Allowance dated Feb. 25, 2015", 8 pgs.
"U.S. Appl. No. 11/996,501, PTO Response to Rule 312 Communication dated May 13, 2015", 2 pgs.
"U.S. Appl. No. 11/996,501, PTO Response to Rule 312 Communication dated Jun. 1, 2015", 2 pgs.
"U.S. Appl. No. 11/996,501, Response filed Jan. 18, 2011 to Final Office Action dated Nov. 15, 2010", 20 pgs.
"U.S. Appl. No. 11/996,501, Response filed Feb. 28, 2014 to Advisory Action dated Jan. 8, 2014", 15 pgs.
"U.S. Appl. No. 11/996,501, Response filed Apr. 9, 2014 to Non Final Office Action dated Mar. 27, 2014", 15 pgs.
"U.S. Appl. No. 11/996,501, Response filed May 9, 2012 to Non Final Office Action dated Jan. 24, 2012", 12 pgs.
"U.S. Appl. No. 11/996,501, Response filed Jun. 25, 3014 to Final Office Action dated Apr. 25, 2014", 19 pgs.
"U.S. Appl. No. 11/996,501, Response filed Jul. 25, 2014 to Advisory Action dated Jul. 8, 2014", 13 pgs.
"U.S. Appl. No. 11/996,501, Response filed Jul. 31, 2012 to Final Office Action dated May 31, 2012", 21 pgs.
"U.S. Appl. No. 11/996,501, Response filed Aug. 3, 2011, Examiner's Answer to Appeal Brief mailed Jun. 3, 2011", 19 pgs.
"U.S. Appl. No. 11/996,501, Response filed Sep. 26, 2013 to Non Final Office Action dated Jun. 26, 2013", 7 pgs.
"U.S. Appl. No. 11/996,501, Response filed Oct. 30, 2010 to Non Final Office Action dated Jun. 29, 2010", 19 pgs.
"U.S. Appl. No. 11/996,501, Response filed Oct. 30, 2012 to Advisory Action dated Aug. 6, 2012", 19 pgs.
"U.S. Appl. No. 11/996,501, Response filed Dec. 30, 2013 to Final Office Action dated Oct. 29, 2013", 8 pgs.
"U.S. Appl. No. 14/718,741, Final Office Action dated Feb. 17, 2017", 30 pgs.
"U.S. Appl. No. 14/718,741, Non Final Office Action dated Oct. 11, 2016", 28 pgs.
"U.S. Appl. No. 14/718,741, Response filed Jan. 20, 2017 to Non Final Office Action dated Oct. 11, 2016", 14 pgs.
"U.S. Appl. No. 14/719,205, Non Final Office Action dated Oct. 11, 2016", 20 pgs.
"U.S. Appl. No. 14/719,205, Response filed Feb. 9, 2017 to Non Final Office Action dated Oct. 11, 2016", 14 pgs.
"Authoritative Dictionary of IEEE Standards Terms", IEEE, Seventh Edition, (Dec. 2000), 5 pgs.
"Definition of manipulate", Merriam-Webster.com/Dictionary, [Online] retrieved from the internet: <www.merriam-webster.com/dictionary/manipulate>, (2013), 4 pgs.
"European Application Serial No. 06788183.9, Examination Notification Art. 94(3) mailed Jan. 27, 2012", 7 pgs.
"European Application Serial No. 06788183.9, Extended European Search Report dated Dec. 16, 2010", 10 pgs.
"European Application Serial No. 06788183.9, Response filed Jul. 14, 2011 to Extended European Search Report dated Dec. 16, 2010", 18 pgs.
"European Application Serial No. 15202096.2, Extended European Search Report dated Apr. 25, 2016", 10 pgs.

(56) References Cited

OTHER PUBLICATIONS

"European Application Serial No. 15202096.2, Response filed Dec. 5, 2016 to Extended European Search Report dated Apr. 25, 2016", 17 pgs.
"International Application Serial No. PCT/US2006/028479, International Preliminary Report on Patentability dated Jan. 22, 2008", 4 pgs.
"International Application Serial No. PCT/US2006/028479, International Search Report dated Dec. 28, 2006", 2 pgs.
"International Application Serial No. PCT/US2006/028479, Written Opinion dated Dec. 28, 2006", 3 pgs.
"Microsoft Computer Dictionary", Microsoft, 5th ed., (2002), 4 pgs.
"Office Action for Taiwanese Patent Application No. 95126664", 1 pg.
"Sandisk Introduces TriFlash, a High Capacity Small-Size Embedded Flash Memory Device; Business Wire", The Free Library, (Nov. 13, 2000), 6 pgs.
"Schneier on Security: Crypto Implementation Failure", Schneier, Volume blog, (Mar. 4, 2010), 42 pgs.
"Taiwanese Application Serial No. 095126664, Office Action dated May 12, 2010", (With English Translation), 6 pgs.
"Taiwanese Application Serial No. 095126664, Response filed Aug. 13, 2010 to Office Action dated May 12, 2010", With English Translation of Claims, 35 pgs.
"U.S. Appl. No. 14/718,741, Response filed May 17, 2017 to Final Office Action dated Feb. 17, 2017", 15 pgs.
"U.S. Appl. No. 14/719,205, Advisory Action dated May 19, 2017", 3 pgs.
"U.S. Appl. No. 14/719,205, Final Office Action dated Mar. 15, 2017", 19 pgs.
"U.S. Appl. No. 14/719,205, Response filed May 12, 2017 to Final Office Action dated Mar. 15, 2017", 9 pgs.
"U.S. Appl. No. 14/718,741, Advisory Action dated Jan. 12, 2018", 5 pgs.
"U.S. Appl. No. 14/718,741, Final Office Action dated Oct. 27, 2017", 26 pgs.
"U.S. Appl. No. 14/718,741, Non Final Office Action dated Jul. 17, 2017", 24 pgs.
"U.S. Appl. No. 14/718,741, Response filed Oct. 16, 2017 to Non Final Office Action dated Jul. 17, 2017", 12 pgs.
"U.S. Appl. No. 14/718,741, Response filed Dec. 20, 2017 to Final Office Action dated Oct. 27, 2017", 10 pgs.
"U.S. Appl. No. 14/719,205, Examiner Interview Summary dated Jun. 20, 2017", 2 pgs.
"U.S. Appl. No. 14/719,205, Non Final Office Action dated Oct. 2, 2017", 19 pgs.
"U.S. Appl. No. 14/719,205, Responise filed Jul. 5, 2017 to Advisory Action dated May 19, 2017", 11 pgs.
"U.S. Appl. No. 14/718,741, Notice of Allowance dated Mar. 15, 2018", 9 pgs.
"U.S. Appl. No. 14/718,741, Response filed Jan. 26, 2018 to Final Office Action dated Oct. 27, 2017 and to Advisory Action dated Jan. 12, 2018", 12 pgs.
"U.S. Appl. No. 14/719,205, Final Office Action dated Mar. 12, 2018", 20 pgs.
"U.S. Appl. No. 14/719,205, Notice of Allowance dated May 24, 2018", 6 pgs.
"U.S. Appl. No. 14/719,205, Response filed Jan. 23, 2018 to Non Final Office Action dated Oct. 2, 2017", 10 pgs.
"U.S. Appl. No. 14/719,205, Response filed May 7, 2018 to Final Office Action dated Mar. 12, 2018", 7 pgs.
"European Application Serial No. 15202096.2, Communication Pursuant to Article 94(3) EPC dated Jan. 31, 2018", 13 pgs.
"European Application Serial No. 15202096.2, Response filed Jul. 25, 2018 to Communication Pursuant to Article 94(3) EPC dated Jan. 31, 2018", 12 pgs.
"European Application Serial No. 15202096.2, Summons to Attend Oral Proceedings mailed Sep. 3, 2018", 12 pgs.
Garfinkel, Simon, et al., "Practical UNIX and Internet Security the su Command: Changing Who You Claim to Be", Practical UNIX and Internet Security, 3rd Edition, [Online] Retrieved from the internet: <http://proquest.safaribooksQnline.com/bool</networking/security/0596003234/5dot-users-groups-and-the-superuser/puis3-chp-5-sect-3?uicode=EPO>, (Feb. 21, 2003), 5 pgs.
"European Application Serial No. 15202096.2, Decision to Refuse a European Patent Application mailed Feb. 12, 2019", 33 pgs.

\* cited by examiner

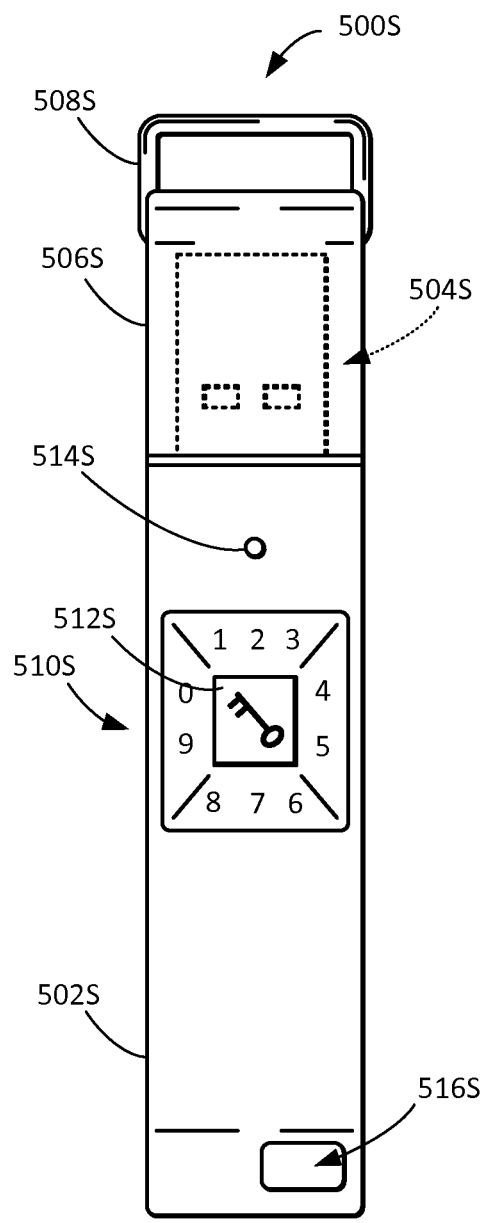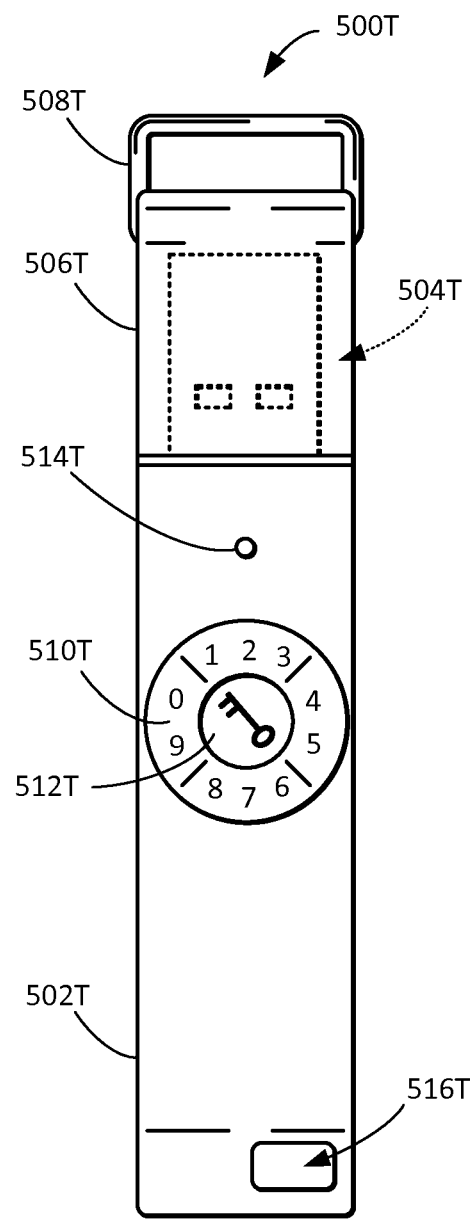
FIG. 5S                    FIG. 5T

MEMORY LOCK SYSTEM WITH MANIPULATABLE INPUT DEVICE AND METHOD OF OPERATION THEREOF

CROSS-REFERENCE TO RELATED APPLICATION(S)

This is a continuation of U.S. patent application Ser. No. 11/996,501 filed Jan. 22, 2008, issued as U.S. Pat. No. 9,075,571, which is the National Stage of International Application No. PCT/US2006/028479 filed Jul. 20, 2006, which claims the benefit of U.S. Provisional Patent Application No. 60/595,631, filed Jul. 21, 2005, and the subject matter thereof is incorporated herein by reference thereto.

The present application contains subject matter related to concurrently filed U.S. patent application Ser. No. 14/718, 741, filed May 21, 2015, entitled "MEMORY LOCK SYSTEM WITH MANIPULATABLE INPUT DEVICE AND METHOD OF OPERATION THEREOF".

The present application contains subject matter related to concurrently filed U.S. patent application Ser. No. 14/719, 205, filed May 21, 2015, entitled "MEMORY LOCK SYSTEM WITH MANIPULATABLE INPUT DEVICE AND METHOD OF OPERATION THEREOF".

TECHNICAL FIELD

The present invention relates generally to electronic devices, and more particularly to memory devices.

BACKGROUND ART

Security is a critical issue with almost all aspects of computer use and mobile electronic device use, including portable memory storage devices. This also applies to any electronic products, such as camcorders, digital cameras, iPODs, MP3 players, smart phones, palm computers, gaming devices, etc., using such devices. Whether it is logging into an email account, protecting personal medical info, family pictures, etc. or accessing bank information, information must be supplied to gain access to view personal data. Much money and effort has been applied to guarding personal, corporate, and government information from hackers and others.

In an effort to preserve our identities and prevent unauthorized access to computer systems, it is industry practice to use different login names and passwords for each unique account. Many people currently write this information on paper notes that are carried between home and office, or out of town. Unfortunately, a paper note is not secure. If the paper note is dropped, anyone who finds it has access to all listed accounts.

To prevent access, electronic devices have been created such as a key chain tokens that allow management of up to 50 logins. The downside is that the solution requires manual transfer from a display to the computer and has a limited number of logins.

Further problems are occurring with portable memory devices. These data storage devices are small, ubiquitous, cheap (and getting cheaper), have huge memories (which are getting larger fast), and in today's configurations pose extraordinary security problems. A typical example is the Universal Serial Bus (USB) Flash Drive. The USB is an external peripheral interface standard for communication between a computer and external peripherals over a cable using bi-serial transmission. Millions of USB Flash Drives (UFDs) are being used not only for data backup, transfers, and intermediate storage, but also as primary storage for "portable content".

Portable content is data or other information that is tied to an owner and not to a particular computer. A host computer is only a way to access and manipulate the portable content. It is becoming critical that portable memory devices have a security system for the content, which is host-independent and self-contained, since the content may otherwise be accessed and manipulated by unauthorized users using different computers in potentially security-hostile environments (kiosks, Internet cafés, presentation stations).

The affected user community is huge and every aspect of society is already vulnerable to security leaks and data compromise. Because the devices lack reliable and usable security features, financial databases, medical records, business records, national security information, in short any confidential information, can be exposed and sent anywhere within seconds. Private, government, military, and corporate users are all concerned more than ever with being able to secure information on these portable, tiny, and easy to lose and steal devices, while being able to securely transfer data between different platform computers and embedded systems.

Portable memory devices are commonly connected to different computers in various environments that are security-uncontrolled and security-hostile. Consequently, for any portable memory device that needs security, it is critical that the security system onboard be self-contained and independent of external computers.

The most common means of providing security for information on these devices is to incorporate a password set accessed through software. Unfortunately, such security provides little deterrent to anyone willing to use readily available hacking techniques to get at the data.

There are number of current systems used to gain access to secure devices such as key loggers and USB "sniffers." These systems can be installed on a target computer without the user's knowledge. Once a password or security exchange has been captured, it can then be sent to a malicious source.

More recently, biometric passwords (such as finger print detectors) have been incorporated into some of these devices and other computer peripherals, like keyboard, laptops, etc. Unfortunately, biometric sensors and security safeguards, by their nature, are capable of being circumvented.

With the growing numbers of portable memory storage devices and electronic products utilizing them, the need for security for the data (medical, financial, corporate, military, songs, pictures, movies, etc.) on these electronic products is greater than ever. No current technology has become available to provide the level of security that users need.

In an effort to prevent identity theft and prevent unauthorized access to computer systems, it is industry practice to use different login names and passwords for each unique account. In addition, it is recommended practice to change passwords at regular intervals. But this is time consuming and causes problems when passwords are forgotten.

Solutions to these problems have been long sought but prior developments have not taught or suggested any solutions and, thus, solutions to these problems have long eluded those skilled in the art.

DISCLOSURE OF THE INVENTION

The present invention provides a method of operation of an authentication system including: receiving a login credential for inputting into a memory lock system; detecting a communication channel from the memory lock system to an electronic system; setting a memory of the memory lock system to an unlocked status based on the login credential; providing authentication information from the memory based on the unlocked status; and enabling an access to an account based on the communication channel and based on the authentication information.

The present invention provides an authentication system including: an input device for receiving a login credential for inputting into a memory lock system; a controller for detecting a communication channel from the memory lock system to an electronic system; a locking function controller for setting an unlocked status to a memory of the memory lock system based on the login credential; a transfer function controller for providing authentication information from the memory based on the unlocked status; and wherein: the controller is for enabling an access to an account based on the communication channel and based on the authentication information.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
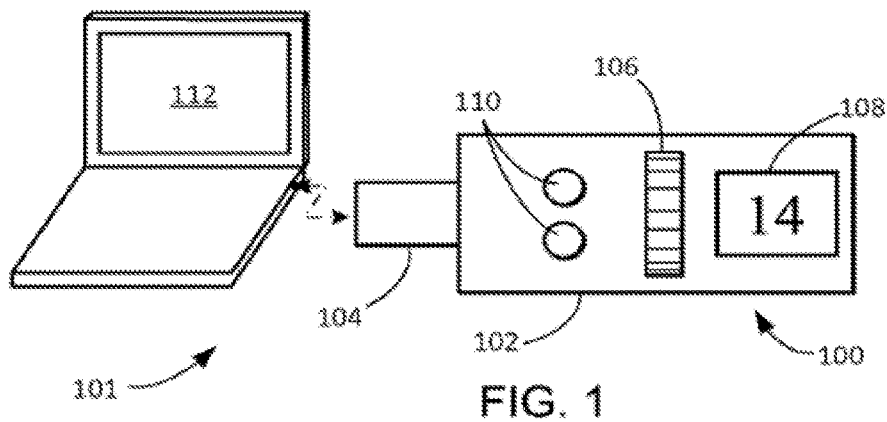
FIG. 1 is a representational schematic of a secure memory system including a memory lock system in accordance with a first embodiment of the present invention.

The following embodiments are described in sufficient detail to enable those skilled in the art to make and use the invention, and it is to be understood that other embodiments would be evident based on the present disclosure and that process or mechanical changes may be made without departing from the scope of the present invention. The representation schematics disclose operative connections and components of a memory lock system as well as other devices and/or mechanisms with which it is used.

In the following description, numerous specific details are given to provide a thorough understanding of the invention.

However, it will be apparent that the invention may be practiced without these specific details. In order to avoid obscuring the present invention, some well-known circuits, system configurations, and method steps are not disclosed in detail.

Likewise, the drawings showing embodiments of the apparatus/device are semi-diagrammatic and not to scale and, particularly, some of the dimensions are for clarity of presentation and are shown greatly exaggerated in the drawing FIGS. Some of the embodiments are numbered "first", "second", etc. merely for convenience of description and the numbering has no significance.

Referring now to FIG. 1, therein is shown a representational schematic of a secure memory system 101 including a memory lock system 100 in accordance with a first embodiment of the present invention. The memory lock system 100 includes a body 102 having an electronic connector 104, a manipulatable device 106, a display 108, and an indicator 110.

The electronic connector 104 is intended to connect the memory lock system 100 to a computer 112 or other electronic system. The electronic connector 104 can be a USB connector, a cable connector, a wire, a wireless connector, or other intermediate connection among components. The manipulatable input device 106 can be a thumb wheel, switch, knob, electromechanical device, or opto-electromechanical device. The manipulatable device 106 can also be a capacitive sensor, light sensor, or touch sensitive device. The display 108 can be a numeric, alphabetic, alphanumeric, or graphic (picture) display. The indicator 110 can be a single indicator or a double indicator for a lock and an unlock condition of the memory lock system 100.

Figure 2:
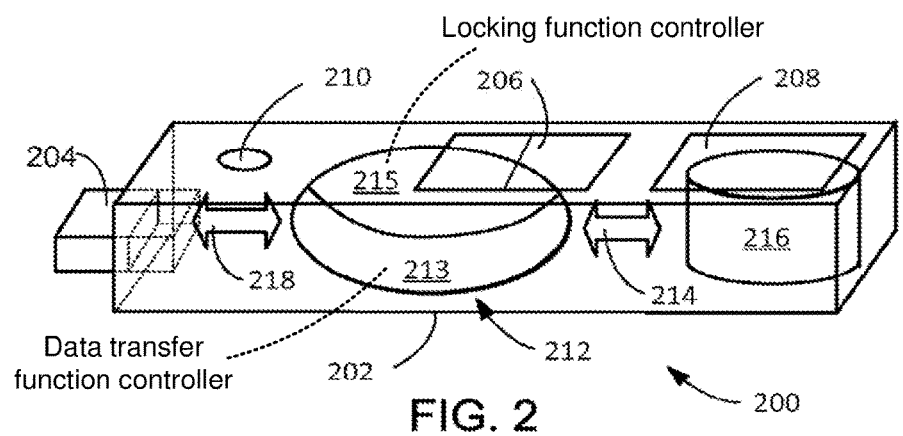
FIG. 2 is a representational schematic of a memory lock system in accordance with a second embodiment of the present invention.

Referring now to FIG. 2, therein is shown a representational schematic of a memory lock system 200 in accordance with a second embodiment of the present invention. The memory lock system 200 includes a body 202 having a connector 204 with a manipulatable input device 206 (pushbutton shown), a display 208, and an indicator 210.

Schematically illustrated are the contents of the body 202, which includes a controller, such as a single micro-controller 212, connected by a communication channel 214 to a memory 216, such as a flash memory, micro disk, or other file storage system.

The micro-controller 212 is also connected by a communication channel 218 to the connector 204. The micro-controller 212 can have part of its operations dedicated to a data transfer function between the connector 204 and the memory 216 and another part to the locking function or can have the two functions in separate controllers, a data transfer function controller 213 and a locking function controller 215. The manipulatable input device 206 is for entering a combination to match a combination in the micro-controller 212 to unlock or lock the data transfer or for entering a combination to change a combination in the micro-controller 212. In the embodiment of FIG. 2, power for the memory lock system 200 can be drawn from the electronic connector 204 from the electronic system to which it is connected.

Where the power for the memory lock system 200 is drawn from the electronic connector 204, the micro-controller 212 can use the locking function controller 215 to shut down the power to or reset the state of the data transfer function controller 213 to prevent or lock data transfer in the micro-controller 212. The micro-controller 212 can also shut down power to or otherwise disable the memory 216 to prevent or lock data transfer in the memory.

The micro-controller 212 can also obviously control switches (not shown) in the communication channel 218 between the electronic connector 204 and the data transfer function controller 213 or in the communication channel 214 between the micro-controller 212 and the memory 216 to control unlocking or locking of the data transfer therebetween.

The above can also be set up for disk battery powered systems but more care must be taken so as to conserve battery power.

Figure 3:
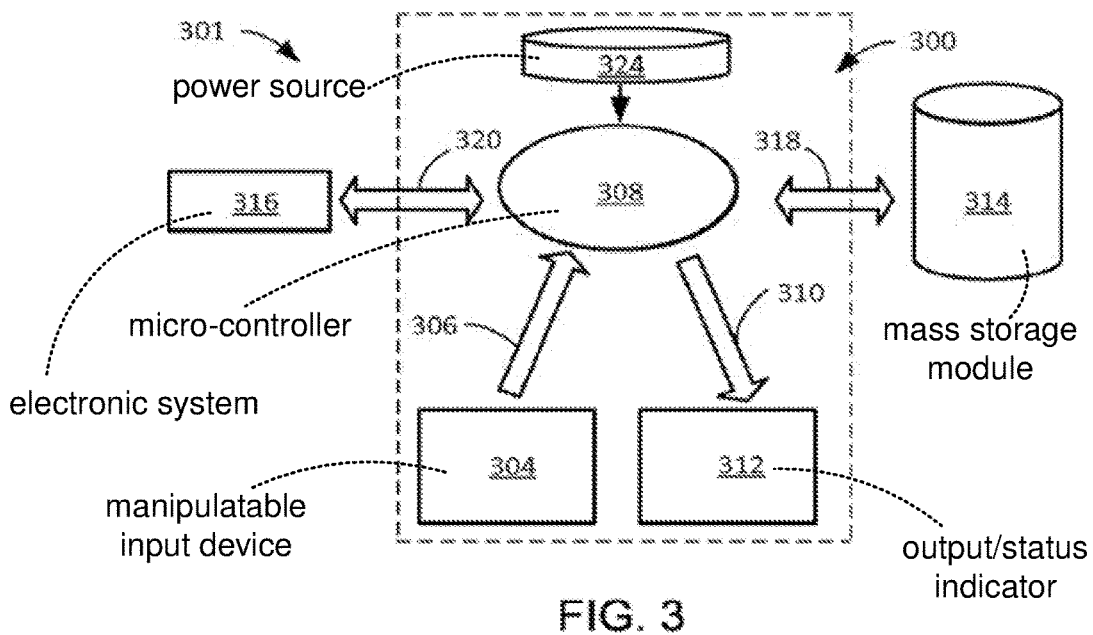
FIG. 3 is a representational schematic of a secure memory system including a memory lock system in accordance with a third embodiment of the present invention.

Referring now to FIG. 3, therein is shown a representational schematic of a secure memory system 301 including a memory lock system 300 in accordance with a third embodiment of the present invention. The memory lock system 300 includes a manipulatable locking mechanism or manipulatable input device 304, such as a two-position switch. The input device 304 is connected by a communication channel 306 to a micro-controller 308, which is connected by a communication channel 310 to an output/status indicator, such as a numeric display 312, in the manipulatable input device 304. This completes the memory lock system 300.

The memory lock system 300 can be incorporated between any memory, such as a mass storage module 314, and an electronic system 316, such as a digital camera, internal hard drive of the computer, smart phone, palm computer, digital music players, or other computer-type device. The micro-controller 308 is connected by a communication channel 318 to the mass storage module 314 and by a communication channel 320 to the electronic system 316.

While the memory lock system 300 can be powered from the electronic system 316 through an appropriate connector, a portable power source, such as a battery 324, can provide power to the memory lock system 300. The battery 324 may be a so-called high-density "button" battery.

One method of operation is:
The memory lock system 300 is normally off to conserve battery power.
When the input device 304 is manipulated by pressing one side of the two-position switch, the micro-controller 308 wakes up and activates the numeric display 312.
The numeric display 312 initially shows "00" and increments 01, 02, 03, . . . , 98, 99 as the switch is pressed.
Like common combination locks, it takes a sequence of three numbers to unlock. For example, say the combination is 22, 68, 17.
The input device 304 is manipulated until the number 22 appears in the display.
The user then presses the other side of the two-position switch. The micro-controller detects the change and changes the display numbers past 00 until 68 appears in the display.
The original side of the two-position switch is pressed until 17 appears.
The device is now unlocked.
Three 2-digit numbers gives 1,000,000 possible combinations. If desired, 3-digit numbers will give 1,000,000,000 combinations.
Any electronic tampering will render the device inoperable. While the unlocking mechanism in some embodiments is an electro-mechanical switch, it is actually software in the micro-controller 308 that is monitoring the numeric input.
If the device is plugged in without unlocking, it will not function and will be invisible to the host computer/system.

In the memory lock systems, the manipulatable device provides security by requiring physical manipulations (i.e. entering a combination, not a software password) before the onboard functions can be addressed. Thus, the memory lock systems are immune to all electronic cracking, hacking, and bypass attempts. Until the onboard security is activated, the memory of the computer or electronic system containing information or data cannot be written to, interrogated, or read from by any electronic product the memory lock system is a part of or to which it may be connected.

Also, any information or data in the memory or file storage cannot be written to, interrogated, or read from by any electronic product the memory lock system is a part of or to which it may be connected.

Unlike other solutions, the memory lock system is self-contained, and integrated with an internal memory (either portable or "internal" to the bigger assembly) in a device. The computer system (for example, laptop, smart phone, desktop computer, etc.) does not need to know there is anything special about the device. In this sense, it is independent of operating systems, drivers, applications and computer platforms. It is applicable for use on an embedded system such as a navigation system in military, commercial and private systems.

The present invention solves some of the following problems associated with current security/protection methods:
Eliminates the need for an external computer to establish security: locking is self-contained and security depends solely on the memory device itself and its resident hard/software.
Eliminates the need for a complex and error-prone configuration procedure to establish security.
Prevents password grabbing, which is common in security-questioned environments (e.g. internet café, kiosks, many national-security applications, etc.).
Solves security problems that are platform-specific (e.g. security flaws in various Microsoft™ and other programs), because the device is platform-independent.
Cannot be reformatted when it is still locked (because it is invisible to the host computer when locked)
Due to platform independence, data can be moved between different operating systems, and various machines, instruments, and any embedded piece of electronic equipment.

The memory lock system is a "controlled access (lock/unlock)" memory system that can be integrated (internally or externally) with any type of electronic products including, but not limited to smart-phones, cell-phones, iPODS, MP3 players, gaming devices, camcorders, digital cameras, computers, and palm computers. The memory device allows the user to save virtually any proprietary information including, but not limited to, accounts, user names, passwords, financial, credit card information, web links, medical info/records, corporate, military, etc.

In addition, it acts as a secure backup device whose contents cannot be viewed until unlocked (for example, personal medical, financial info, digital pictures, etc.). The lock consists of an electromechanical device that acts much like existing mechanical combination locks.

In application as a "portable memory" device (such as an external memory device exemplified by a flash drive of the memory lock system 100 of FIG. 1 or the memory lock system 200 of FIG. 2), it is attached to a communication port of the PC (for example, a USB port of the computer 112 of FIG. 1). To a computer system, this is simply a storage device. However, it has a lock that cannot be accessed from the computer system. The memory lock system remains inoperable and invisible until compare circuitry or firmware in the memory lock system recognizes the correct combination of numbers, colors, pictures, and/or letters. The memory lock system will not respond to any Windows driver commands unless unlocked. When the correct sequence has been entered, the memory device unlocks and becomes operable. This memory lock system could also be in a form that is password protected (sometimes in addition to a mechanical lock).

For some applications, the "lock" can have a "timer" which can be set to be keeping the lock "locked" for a certain period of time or until a certain date. Once connected, an application is invoked that provides access to encrypted data stored internally. The memory lock must remain attached to the computer to view its contents. If the memory lock is unplugged, the application terminates. The memory becomes locked again.

One of the usages of the present invention is to store/manage login credentials. Of course, there are many others like—"portable content" storage, medical records, digital pictures, financial/corporate data, military applications, multifactor authentication for online banking, and many others.

Also, the memory lock system is capable of storing any file containing confidential information (personal, financial, medical records, etc.). Confidential files can be accessed like any other file on a computer as long as the memory device is unlocked.

The memory lock system 300 could be used for controlled access to many computing devices, electronic products, and applications, e.g. videogames for kids, digital music players, iPODs, camcorders, laptops, smart phones, palm computers, etc. It could be also used in financial industry to provide a "physical" component to a multifactor authentication.

Also, with a memory lock system, cell phone users concerned with security (army, CIA, and any other government and security sensitive people) can protect information in case a cell phone is lost or stolen. One method would use an external memory that contains or protects calling information. Contact information is kept externally instead of internally in the cell phone directory. Phone numbers are referenced from the memory lock system. Once a call has been completed, any internal records of calls and contacts will be erased.

The following are features/functions of different embodiments of the present invention:
  Small package that can be kept on a key chain or in a wallet or integrated in a bigger assembly (like a laptop, for example).
  Data is encrypted to prevent disassembly and reverse engineering. Encryption and un-encryption is done by the software resident on the memory lock system. Other forms of "physical" device hardening can be used instead. For example, epoxy could be applied to the memory chip to prevent chip removal.
  Operates with all computer types including desktops, laptops, and handhelds and embedded systems.
  Can be backed up to a second memory lock system using a computer.
  Has manipulatable lock, user must enter numbers/letters similar in nature to existing combination locks and other forms that do not mimic the conventional lock. Can have a software password in addition. Can also have a timer in addition.
  With appropriate software application, can automatically enter login credentials.
  Internal memory storage for all types of personal data and information.
  Allows storage of credit card information.
  Able to store files of any type.
  Amount of data is limited to size of internal memory.
  Memory can exist in any form including, but not limited to, RAM, Flash, and rotating disk media.
  Internal power source allows unlocking while detached from computer. Device may or may not have a visual status indicator.
  The memory lock systems may have an optional display.
  With a memory lock system "one click" login is possible.
  The memory lock system can be used as external memory for cell phones (e.g. storage for phone book).

The following are additional features/functions of various embodiments of:
  Correct numeric sequence is required to unlock communication channel.
  Security fuse of micro-controller is blown to prevent reverse engineering.
  Device will not respond to any USB commands unless unlocked.
  Manual trial-and-error methods to unlock are not practical. One would have to potentially try 1,000,000 or more combinations.
  Hacking attempts are detected by the micro-controller. Communication channels will remain closed even if correct sequence is subsequently entered.
  If hacking is detected, the memory lock will reset itself at a later time (e.g., 1-hour) where it will return to normal operation.
  Hacking is detected by X number of unsuccessful tries (e.g. 10). Enough to account for normal user mistakes but short enough to prevent unauthorized entry.
  A memory lock system can be pre-set by the factory and cannot be changed.
  A memory lock system pre-set by the factory with an initial lock/unlock combination can be changed by the user once the device is unlocked.
  A memory lock system pre-set by the factory or IT manager with an initial lock/unlock combination can be changed remotely in case the combination is forgotten.

In the present invention, the following terms have the following meanings:
  Power Source—is a means of supplying power to the present invention.
  Input Device—a mechanism to input a sequence of states that can be translated into a combination for display and authentication.
  Output Device—a display or indicator to supply feedback to the user to indicate locked & unlocked status.
  File/Memory Storage—a medium for storing information, data, and files.
  Controller—a micro-controller for monitoring the input device and translating events for the purpose of unlocking or locking the device. It is also used to translate events into some form of output for locked status. Its main function is to internally unlock or lock information transfer between the memory storage and communication channel in an appropriate protocol.
  Combination—can be a sequence of input changes or states that can be reflected as an alphanumeric (or color/picture based) sequence. This input sequence is then compared with an expected value for unlocking.
  Battery—electrochemical device for supplying power when the memory lock system is not drawing power from a USB port or other communication channel.
  USB—Universal Serial Bus communication port and drivers necessary to communicate with host PC.
  Mechanical/motion based generator—a mechanism for translating kinetic energy into electronic.

Solar generator—method of translating light energy into electronic energy.

Thumb wheel—input device for controlling ascending or descending alphanumeric indicators. Turning in one direction causes numbers to increase, turning in the opposite direction causes numbers to decrease (for example).

Rocker Switch—similar to a thumb wheel and is used for controlling ascending or descending alphanumeric indicators. Pressing one side of the switch causes numbers to increase; pressing the other side causes numbers to decrease.

Touch Pad—input device similar to that associated with notebook computers. The pad is broken up into a grid. Actuating specific areas in the grid in a specific order creates a combination used for unlocking.

Selector Switch—a switch that does not require power to operate. It contains a physical mechanism for retaining its location like the selector switch for controlling the lights on your car. The controller reads its state after power is applied.

Encoder—a dynamic switch whose outputs change in relation to the direction of motion. Its use is similar to that of a thumb wheel.

Push Button Array—like a quick unlock seen on some security doors, pushing a sequence of buttons in a certain order provides the mechanism for unlocking.

Potentiometer—a potentiometer is like a one dimensional touch pad. The difference is that its location can be fixed without power. The potentiometer state is read once power is applied. Readings by an A/D converter translate position into values used for unlocking.

Photoelectric switch—a component that is able to differentiate between light levels. This could be used as a mode of input by covering/uncovering the sensing device.

Membrane switch—a component that is able to differentiate between "up" and "down" position of the membrane (similar to the push buttons but much lower profile). This could be used as a mode of input when the height of the device is a critical issue.

Alphanumeric Display—a means of displaying alphanumeric data representing a combination for unlocking.

Colored LED—an indicator of locked and unlocked status. For example, red could indicate locked & green unlocked.

Audio—provides audio feedback as to locked and unlocked state.

Solid State Memory—SRAM, DRAM, EPROM, EEPROM, Flash, magnetic, ferromagnetic, or any other type of electronic memory used to store information without moving parts. This would also include U3 smart drives that can contain an entire operating system with applications.

Rotating Media—includes the class of traditional and portable hard drives and its derivatives used to store information and requiring moving parts.

Figure 4:
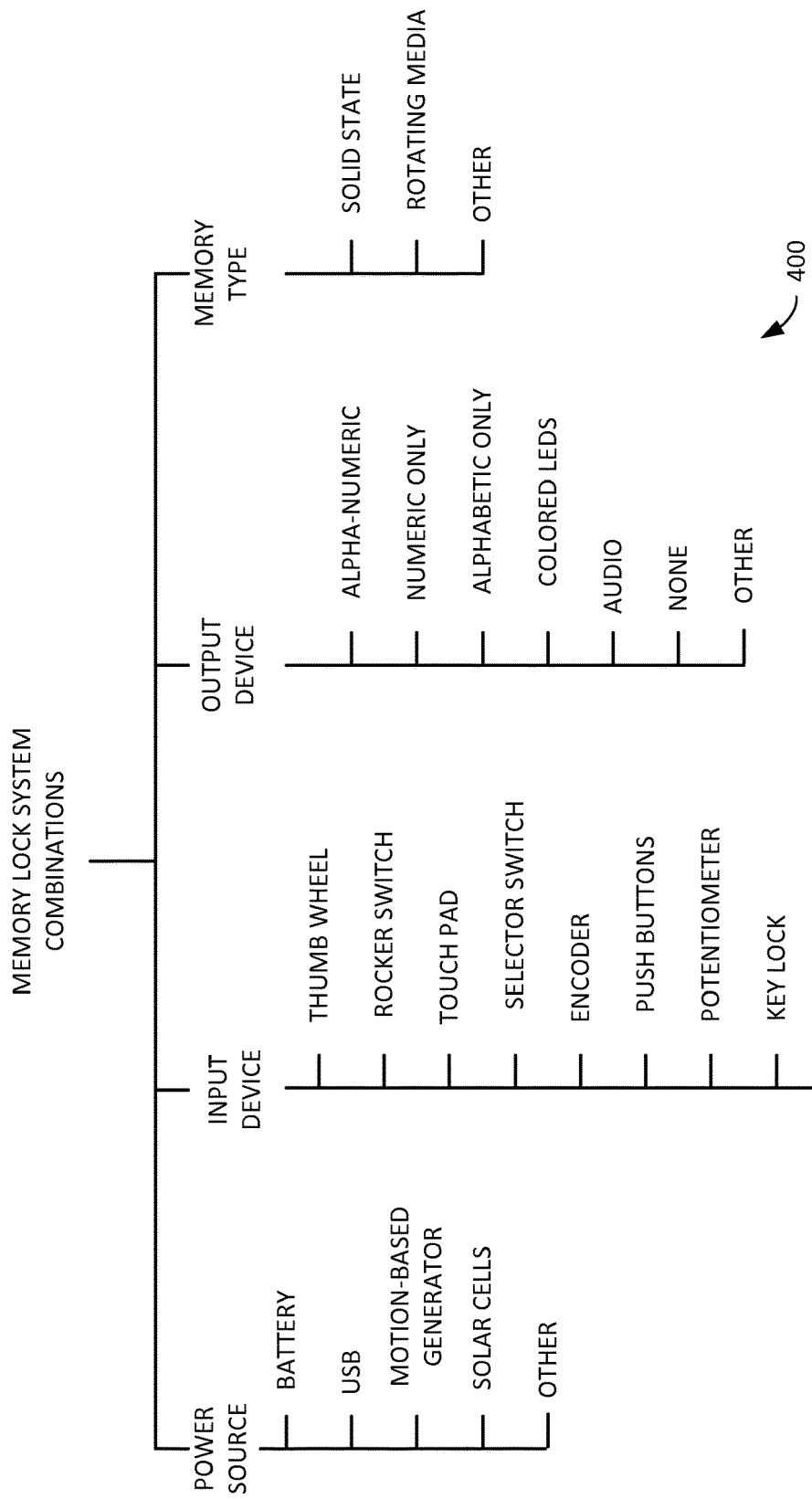
FIG. 4 is shown a table of various combinations of elements that can be put together to form a memory lock system.

Referring now to FIG. 4, therein are shown a table 400 of the various combinations of elements that can be put together to form a memory lock system.

The power source of a memory lock system can be at least one or more batteries, a computer battery through a USB connection, a motion-based generator, a solar cell, or other source of electricity such as a fuel cell, etc.

The input device can be a thumb wheel, rocker switch, touch pad, selector switch, encoder, push buttons, potentiometer, key lock, or other manipulatable device, such as capacitive sensors, etc.

The output device can be alpha-numeric, numeric only, alphabetic only, colored light emitting diodes (LEDs), audio, none, or other output, such as tactile Braille pins, etc.

The memory type can be a solid state memory, rotating media, or other memory, such as linear tape, etc.

Figure 5A:
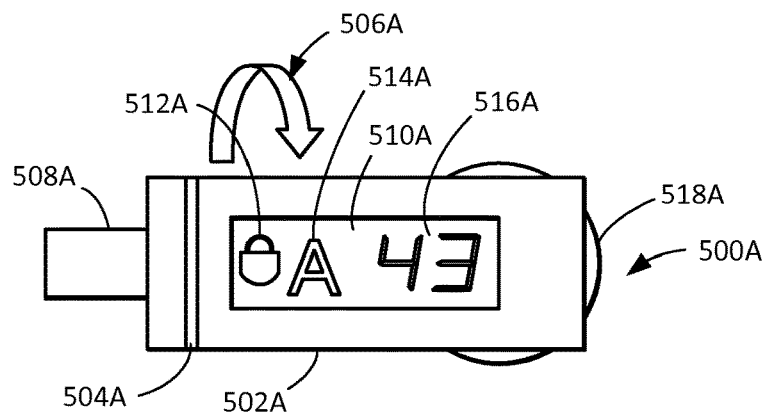
FIGS. 5A-5Z are memory lock systems in accordance with various embodiments of the present invention.
Figure 5B:
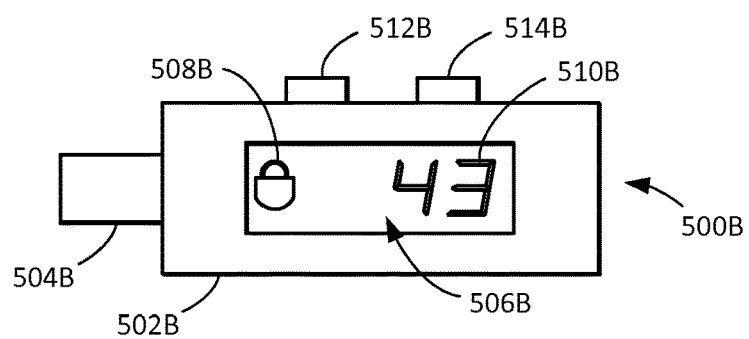
Figure 5C:
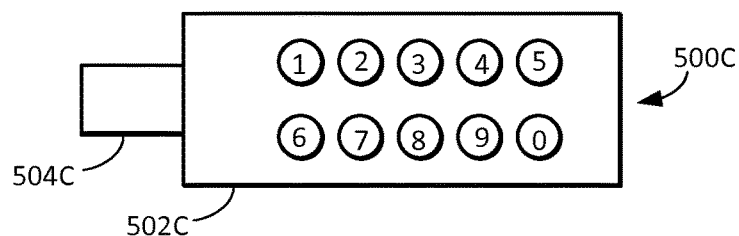
Figure 5D:
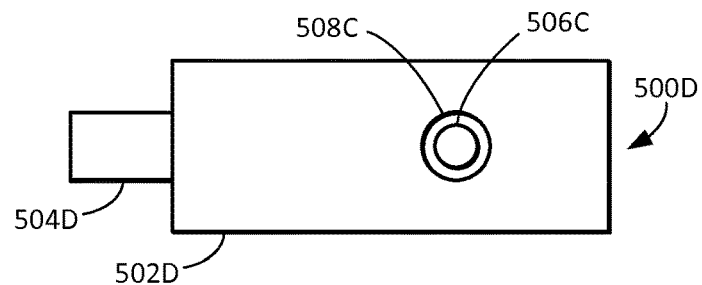
Figure 5E:
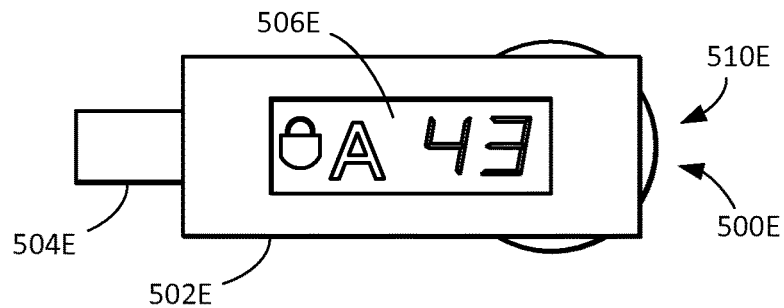
Figure 5F:
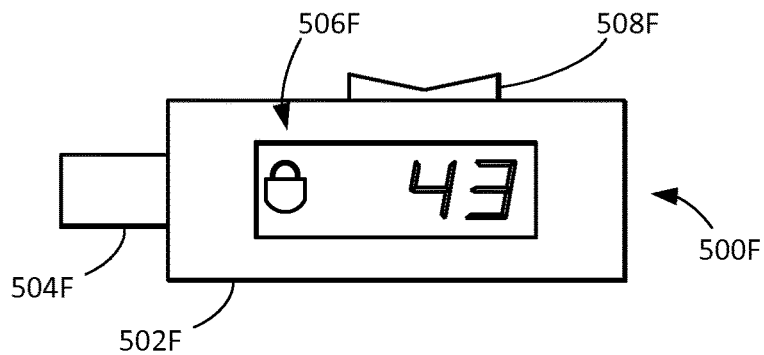
Figure 5G:
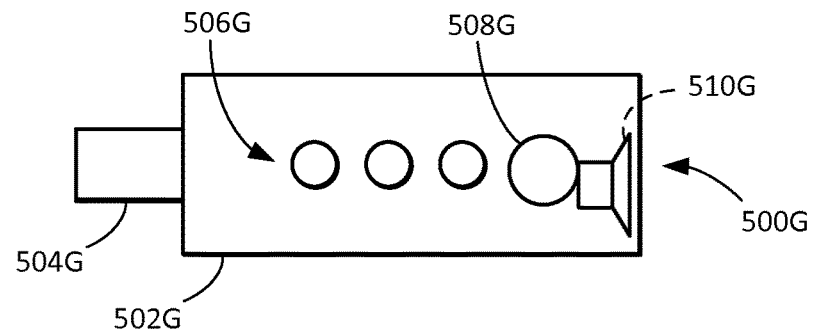
Figure 5H:
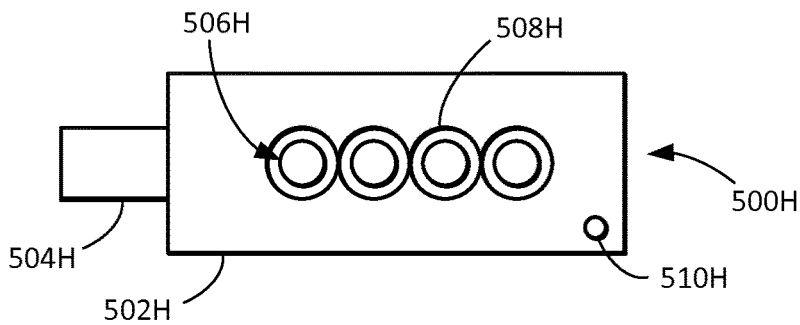
Figure 5I:
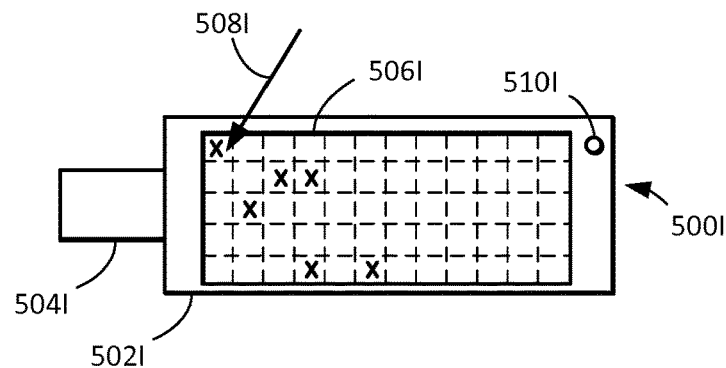
Figure 5J:
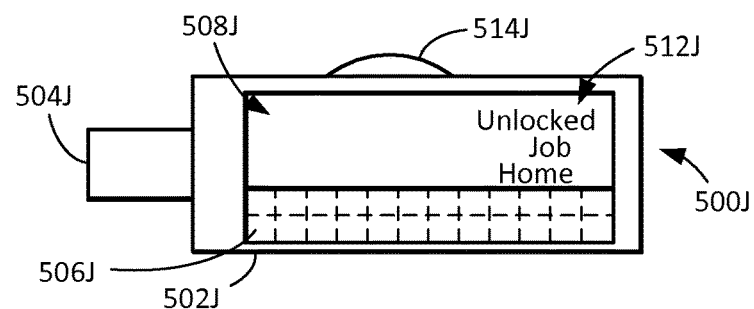
Figure 5K:
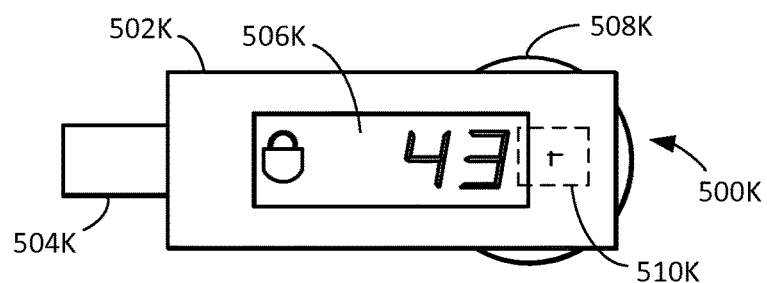
Figure 5L:
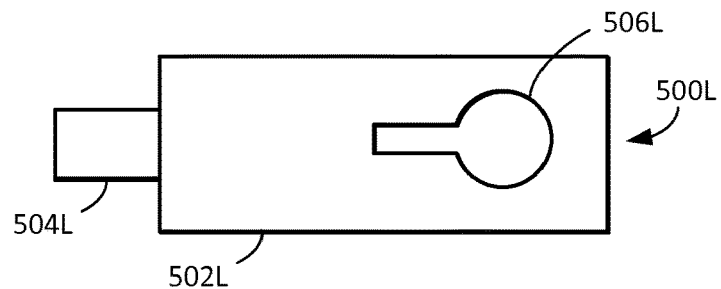
Figure 5M:
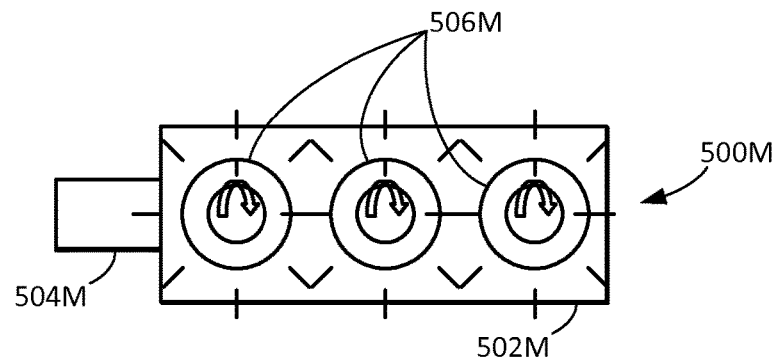
Figure 5N:
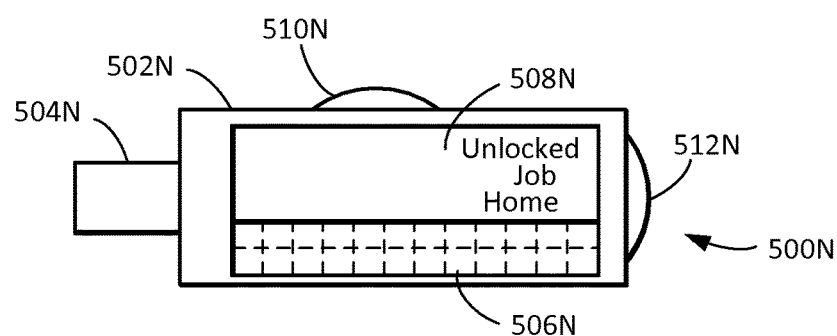
Figure 5O:
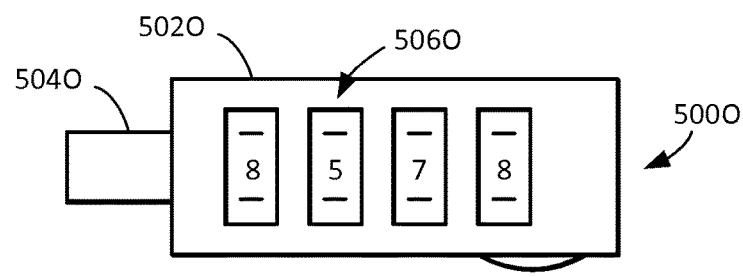
Figure 5P:
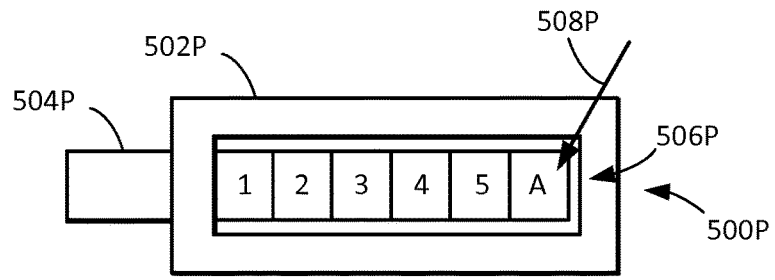
Figure 5Q:
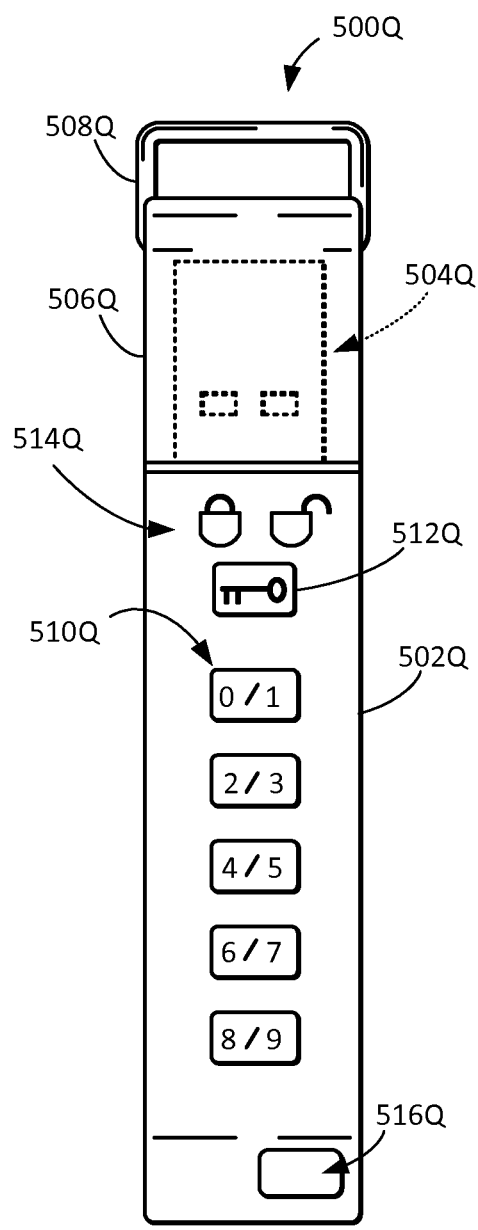
Figure 5R:
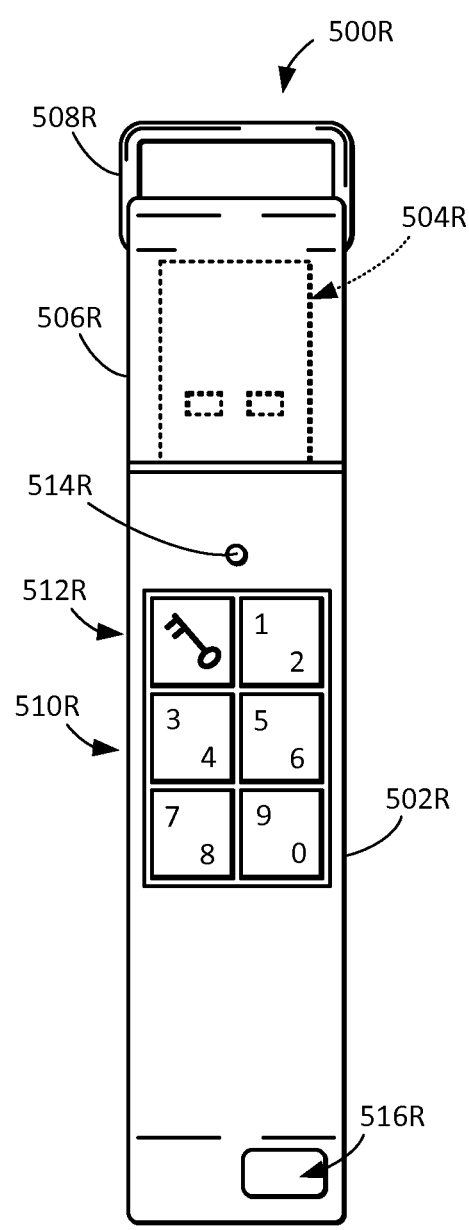
Figure 5U:
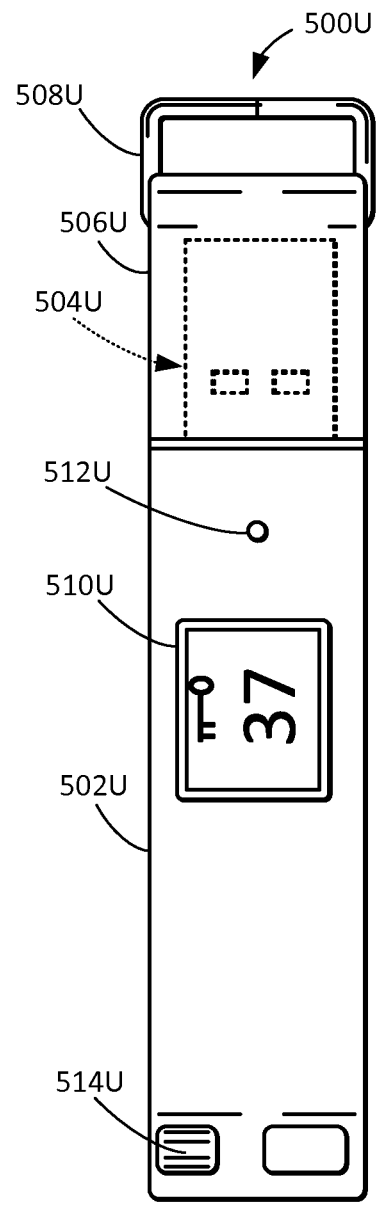
Figure 5V:
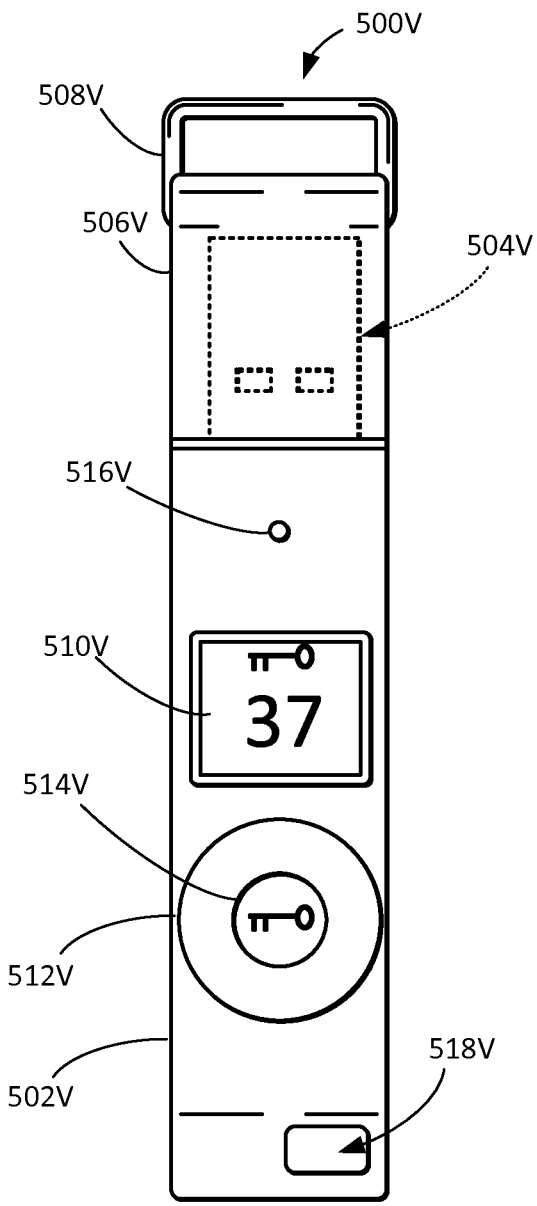
Figure 5W:
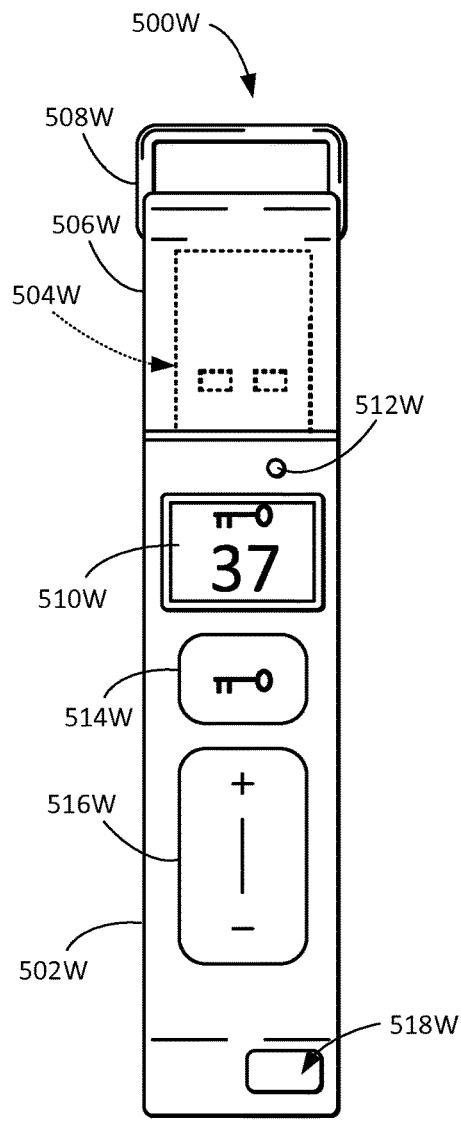
Figure 5X:
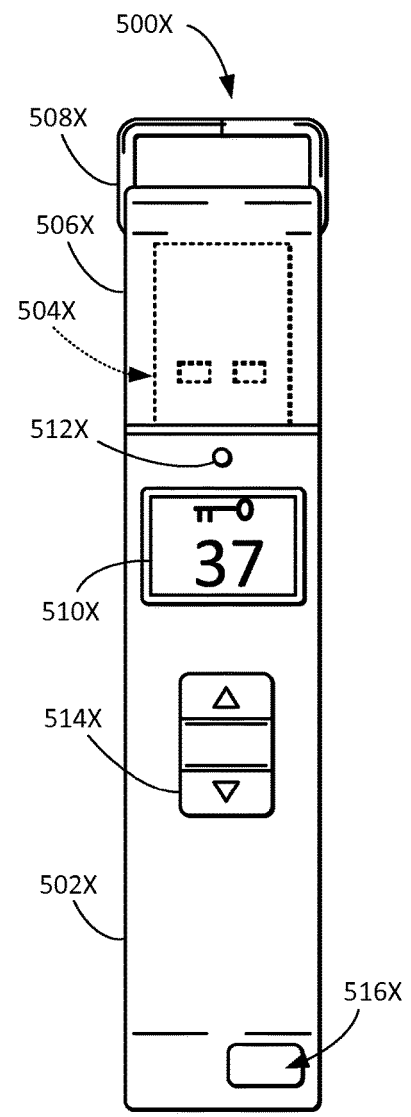
Figure 5Y:
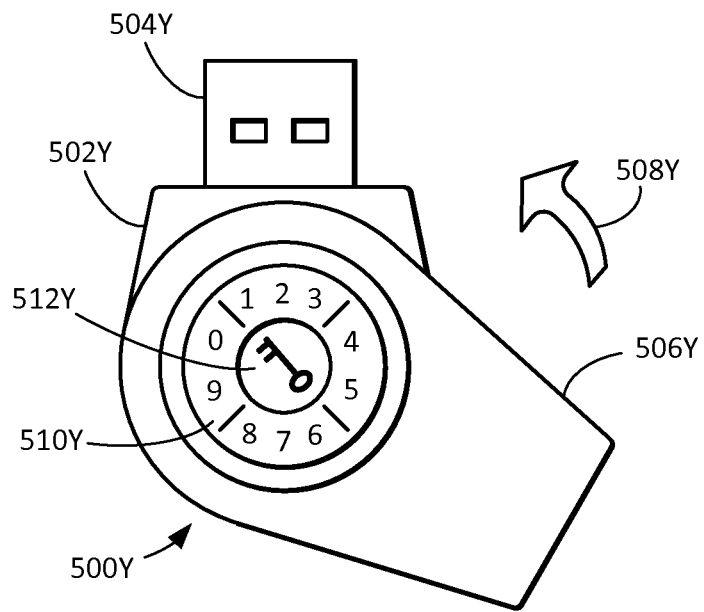
Figure 5Z:
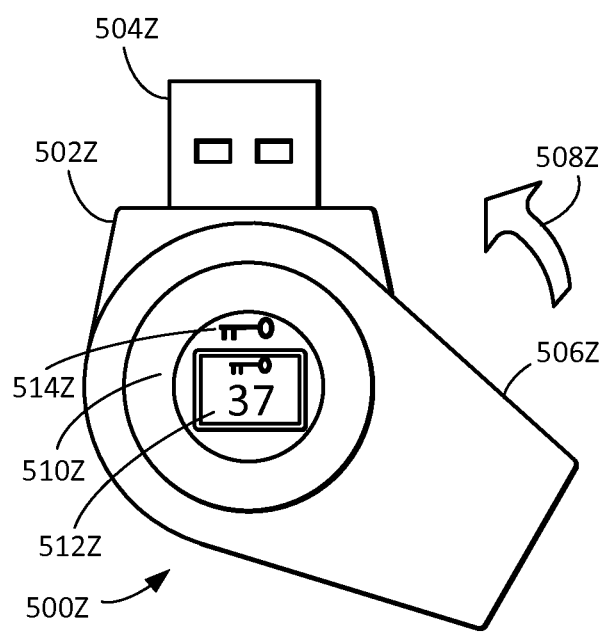

Referring now to FIGS. 5A-5Z, therein are shown memory lock systems in accordance with various embodiments of the present invention. The system of the present invention may be described as a platform independent smart media. It has a physically manipulatable mechanism, electro-, opto-, or mechanical, for entering a combination to allow the transfer of information and data within the memory lock system.

Referring now to FIG. 5A, therein is shown an external configuration of a memory lock system 500A in accordance with a further embodiment of the present invention.

The memory lock system 500A includes a body 502A connected to a swivel 504A which allows the body 502A to turn as shown by the arrow 506A relative to the swivel 504A to accommodate for different positions of the connector 508A.

The body 502A includes a display 510A. The display 510A includes an unlock/lock symbol 512A, an alphabetic character display 514A, and a numeric display 516A.

To change the alphanumeric characters, the memory lock system 500A is provided with a thumb wheel 518A.

Referring now to FIG. 5B, therein is shown an external configuration of a memory lock system 500B in accordance with a further embodiment of the present invention. The memory lock system 500B includes a body 502B and a connector 504B. A display 506B includes a lock/unlock indicator 508B and a numeric character indicator 510B. The lock/unlock indicator 508B and the numeric character indicator 510B are controlled by "alarm-clock" push buttons 512B and 514B, one controlling increasing and the other decreasing of the numeric character indicator 510B.

Referring now to FIG. 5C, therein is shown an external configuration of a memory lock system 500C in accordance with a further embodiment of the present invention. The memory lock system 500C has a body 502C and a connector 504C. The body 502C has no display or indicator. However, the body 502C is provided with one or more push buttons for entry or combination, such as the push buttons 1 through 0 (zero) shown in the FIG. 5C. Optionally, LEDs could be placed under the push buttons.

Referring now to FIG. 5D, therein is shown an external configuration of a memory lock system 500D in accordance with a further embodiment of the present invention. The memory lock system 500D has a body 502D and a connector 504D. The body 502D has no display or indicator but has a single push button 506C for entry of a code using a code system, such as Morse code (time-interval based sequence). The push button 506C is surrounded by a colored LED 508C, which can indicate such things as the press of a push button or a lock/unlock condition of the memory lock system 500D.

Referring now to FIG. 5E, therein is shown an external configuration of a memory lock system 500E in accordance with a further embodiment of the present invention. The memory lock system 500E has a body 502E and a connector 504E. The memory lock system 500E is provided with a lock/unlock indicator and an alphanumeric display 506E. The combination for the memory lock system 500E can be set by a thumb wheel 510E. In some embodiments, the thumb wheel 510E is connected to a generator to provide battery-less electronic power to the memory lock system 500E.

Referring now to FIG. 5F, therein is shown an external configuration of a memory lock system 500F in accordance with a further embodiment of the present invention. The memory lock system 500F has a body 502F and a connector 504F. The body 502F has an image and numeric display 506F and a rocker switch 508F to enter the combination.

Referring now to FIG. 5G, therein is shown an external configuration of a memory lock system 500G in accordance with a further embodiment of the present invention. The memory lock system 500G has a body 502G and a connector 504G. The body 502G is provided with push button switches 506G and a visual indicator 508G. Internal to the body 502G is a mini-speaker 510G for providing audio feedback. The audio feedback can be of the pushbuttons being activated or of the proper entry of the combination or of the incorrect entry of the combination.

Referring now to FIG. 5H, therein is shown an external configuration of a memory lock system 500H in accordance with a further embodiment of the present invention. The memory lock system 500H has a body 502H and a connector 504H. The body 502H has a number of push buttons 506H surrounded by multi-colored LEDs 508H. The LEDs 508H can provide visual feedback of the push buttons being pressed or a color-coded combination. The system has color-coded push buttons (e.g., with colored light emitting diodes, color labels, different color plastic caps, etc.) The body 502H also has a visual lock indicator LED 510H.

Referring now to FIG. 5I, therein is shown an external configuration of a memory lock system 500I in accordance with a further embodiment of the present invention. The memory lock system 500I has a body 502I and a connector 504I. The body 502I has a touch pad 506I, which can be activated by a pointer 508I to enter a location-sensitive combination. The body 502I further has a status indicator 510I in one corner.

Referring now to FIG. 5J, therein is shown an external configuration of a memory lock system 500J in accordance with a further embodiment of the present invention. The memory lock system 500J has a body 502J and a connector 504J. The body 502J contains solar cells 506J for powering the system. The body 502J further has a display 508J and an information section 512J to which the display can be moved to provide different information regarding the condition of the memory lock system 500J, or whether the combination to be applied is for a computer at work, home, or other site. The body 502J further has a thumb-wheel switch 514J.

The thumb-wheel switch 514J can be turned as a thumb wheel and/or depressed to act as a switch. Numbers can be provided on the thumb wheel and activated by depressing the switch to enter the combination number.

Referring now to FIG. 5K, therein is shown an external configuration of a memory lock system 500K in accordance with a further embodiment of the present invention. The memory lock system 500K has a body 502K and a connector 504K. The body 502K has a display 506K and a thumb wheel 508K. The thumb wheel 508K is connected to a motion-based "power" generator and selecting tool 510K. The memory lock system 500K does not require a battery because the power can be generated by turning the thumb wheel 508K.

Referring now to FIG. 5L, therein is shown an external configuration of a memory lock system 500L in accordance with an embodiment of the present invention. The memory lock system 500L has a body 502L and a connector 504L. The body 502L is provided with an electro-mechanical lock 506L for a key (not shown). This provides key lock security of the type used for the physical securing of a computer to be able to secure the data on the computer.

Referring now to FIG. 5M, therein is shown an external configuration of a memory lock system 500M in accordance with a further embodiment of the present invention. The memory lock system 500M has a body 502M and a connector 504M. The body 502M contains one or more absolute encoders or potentiometers 506M. There is no display or battery, and the potentiometers may be set in a certain combination such that they will allow opening or access to the data when power is provided at the connector 504M from the USB output of a computer.

Referring now to FIG. 5N, therein is shown an external configuration of a memory lock system 500N in accordance with a further embodiment of the present invention. The memory lock system 500N has a body 502N and a connector 504N. The body 502N has solar cells 506N for power and a display 508N with arrows showing the direction of horizontal or vertical scrolling on the multi-line display 508N. The body 502N is provided with two thumb wheels 510N and 512N for respectively controlling vertical and horizontal scrolling of the display 508N.

Referring now to FIG. 5O, therein is shown an external configuration of a memory lock system 500O in accordance with a further embodiment of the present invention. The memory lock system 500O has a body 502O and a connector 504O. The body 502O is provided with multiple rotary switches 506O for setting the combination. The body 502O has no display, no battery, and no status indicators.

Referring now to FIG. 5P, therein is shown an external configuration of a memory lock system 500P in accordance with a further embodiment of the present invention. The memory lock system 500P has a body 502P and a connector 504P. The body 502P has a one-line touch pad 506P, which may have alphabetic, numeric, or the alphanumeric, all of which are activated either by a finger or a pen pointer 508P.

Referring now to FIG. 5Q, therein is shown an external configuration of a memory lock system 500Q in accordance with a further embodiment of the present invention. The memory lock system 500Q has a body 502Q and a connector 504Q hidden in a cap 506Q. The cap 506Q has a clip 508Q. The body 502Q has a series of switches 510Q. The switches 510Q can be rocker switches so as to be able to individually enter numbers 1 through 0 (zero) or can be simple membrane switches in which the membrane switches are imprinted with different numbers but only provide one input for both numbers. This allows the user to enter numbers as desired, but limits the number of combinations; e.g., the numbers 1-0 only represent 5 numbers that can actually be entered. The body 502Q further has a combination entry switch 512Q. The combination entry switch 512Q is pressed to activate the numbers and to depress to indicate that the combination has been entered. Indicator lights 514Q representing a closed and an open lock is further provided on the body 502Q to indicate the condition of the memory lock system 500Q. For carrying the memory system 500Q, a strap opening 516Q is provided.

Referring now to FIG. 5R, therein is shown an external configuration of a memory lock system 500R in accordance with a further embodiment of the present invention. The memory lock system 500R has a body 502R and a connector 504R covered by a cap 506R. The cap 506R has a clip 508R. The body 502R has six membrane switches including five numerical switches 510R and one "Enter" switch 512R. The body 502R further has an indicator light 514R and a strap opening 516R. Again, the membrane switches 510R can be rocker switches or single-activation switches. Further, in the event of using single-activation switches, additional numbers can be obtained by depressing the switches so that one depression indicates a first number and a second depression indicates a second number. It can be also activated that any single depression would indicate any number that is shown on the corresponding part of the switch.

Referring now to FIG. 5S, therein is shown an external configuration of a memory lock system 500S in accordance with a further embodiment of the present invention. The memory lock system 500S has a body 502S and a connector 504S covered by a cap 506S having a clip 508S. The body 502S has four membrane switches (or two-directional rocker switches) 510S in a square configuration with an "Enter" key 512S in the center. The membrane switches 510S can be four single-activation switches or can be activated by a number of depressions with the first depression indicating the first number, the second depression indicating the second number, and the third depression indicating the third number. It can be also activated such that any depression would indicate any number that is shown on the corresponding part of the switch in one embodiment, the numbers 1-3 and 6-8 are on two switches and the numbers 4-5 and 0-1 are on the other two. The body 502S further has an indicator 514S and a strap opening 516S.

Referring now to FIG. 5T, therein is shown an external configuration of a memory lock system 500T in accordance with a further embodiment of the present invention. The memory lock system 500T has a body 502T and a connector 504T covered by a cap 506T having a clip 508T. The body 502T has four membrane switches 510T in a circular configuration with an "Enter" key 512T in the center. The membrane switches 510T can be four single-activation switches or can be activated by a number of depressions with the first depression indicating the first number, the second depression indicating the second number, and the third depression indicating the third number. This is similar to the approach used to obtain alphabetic characters on a telephone or cell phone. The body 502T further has an indicator 514T and a strap opening 516T.

Referring now to FIG. 5U, therein is shown an external configuration of a memory lock system 500U in accordance with a further embodiment of the present invention. The memory lock system 500U includes a body 502U and a connector 504U covered by a cap 506U having a clip 508U. The body 502U has a display 510U and an indicator 512U. The body 502U further has a narrowed knob 514U, which can be a multi-function knob providing the enter function, powering the device, and entering the combination.

Referring now to FIG. 5V, therein is shown an external configuration of a memory lock system 500V in accordance with a further embodiment of the present invention. The memory lock system 500V has a body 502V and a connector 504V, which can be covered by rotating a cap 506V in the direction indicated by the arrow 508V. The body 502V has a display 510V and a touch-sensitive enter (pad) switch 512V surrounding a further touch-sensitive switch 514V. The touch-sensitive enter (pad) switch 512V can simulate the rotation of a switch by moving a pointing device, such as a pen, finger, or stylus, around the perimeter of the switch to effectively emulate dialing up a combination. The body 502V further has an indicator light 516V and a strap opening 518V.

Referring now to FIG. 5W, therein is shown an external configuration of a memory lock system 500W in accordance with a further embodiment of the present invention. The memory lock system 500W has a body 502W and a connector 504W covered by a cap 506W having a clip 508W. The body 502W has a display 510W and an indicator 512W. The body 502W further has a touch-sensitive enter switch 514W and a linear touch pad 516W. The linear touch pad 516W may be accessed by a finger or a pen moving between a plus (+) or negative (−) sign indicating whether the numbers are going up or down and a combination when reached can be entered by pressing on the touch sensitive switch 514W. The body 502W further has a strap opening 518W.

Referring now to FIG. 5X, therein is shown an external configuration of a memory lock system 500X in accordance with a further embodiment of the present invention. The memory lock system 500X has a body 502X and a connector 504X covered by a cap 506X having a clip 508X. The body 502X has a display 510X and an indicator light 512X. The body 502X further has a pair of switches (or a rocker switch) 514X for moving the numbers on the display 510X up and down and also for entering the numbers. The body 502X further has a strap opening 516X.

Referring now to FIG. 5Y, therein is shown an external configuration of a memory lock system 500Y in accordance with a further embodiment of the present invention. The memory lock system 500Y has a body 502Y and a connector 504Y. The connector 504Y can be covered by a cap 506Y, which moves in the direction indicated by the arrow 508Y to cover the connector 504Y. The body 502Y contains a number of switches 510Y in a circular configuration around a circular Enter button 512Y. The switches 510Y can be either single-activation to provide four switches or multiple-activation to provide nine numbered combinations.

Referring now to FIG. 5Z, therein is shown an external configuration of a memory lock system 500Z in accordance with a further embodiment of the present invention. The memory lock system 500Z has a body 502Z and a connector 504Z. The connector 504Z may be covered by a cap 506Z moving in the direction as indicated by the arrow 508Z to cover the connector 504Z. The body 502Z has a display 512Z surrounded by a touch key 514Z. In a further embodiment, the display 512Z and the touch key 514Z can be integral. The touch key 514Z is surrounded by a circular touch pad 510Z.

FIGS. 5A-5Z show that various configurations of the memory lock system are possible.

Figure 6:
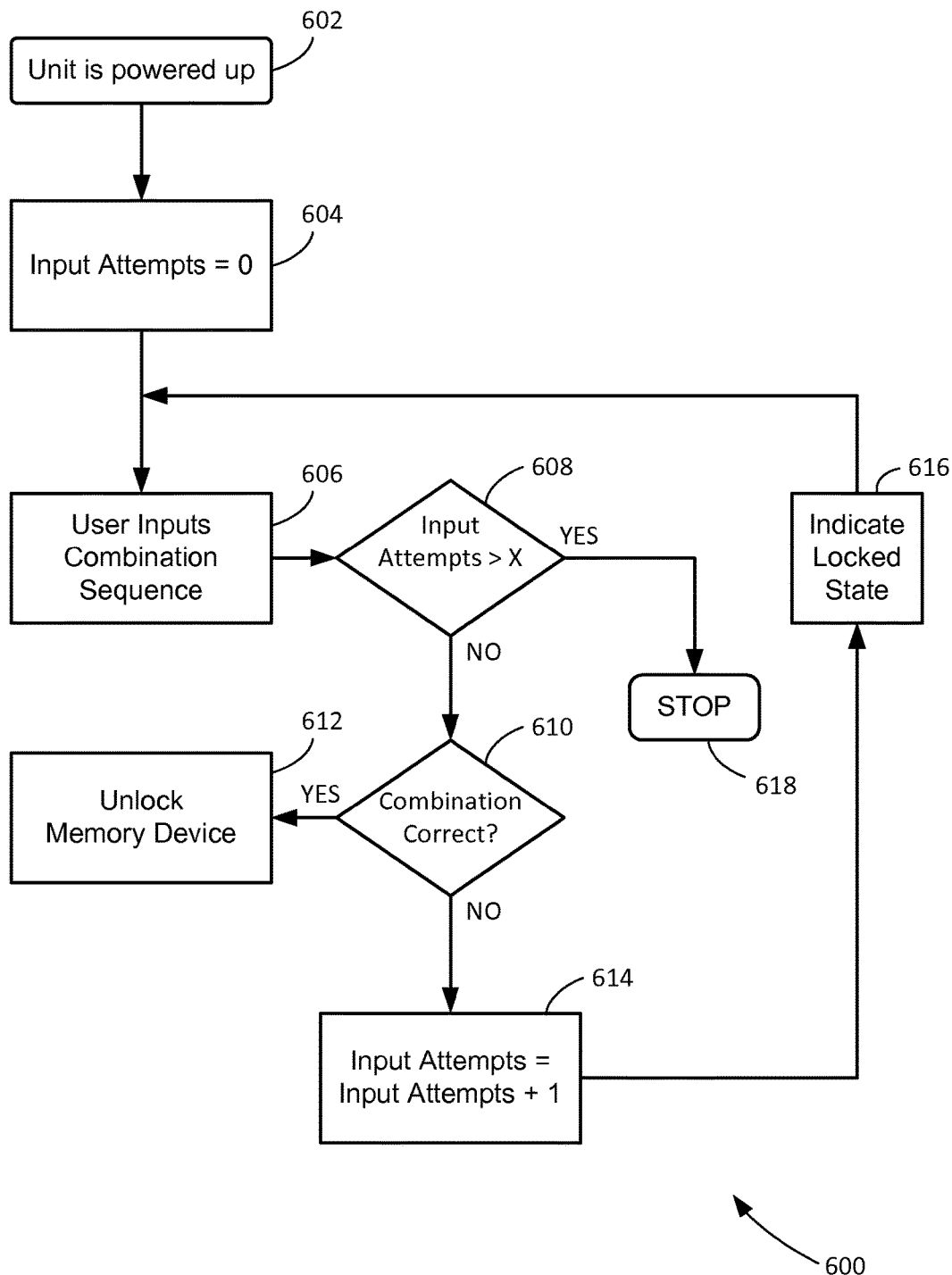
FIG. 6 is a flow chart of an anti-hacking system of a memory lock system, such as the memory lock system of FIG. 3, in accordance with a fourth embodiment of the present invention.

Referring now to FIG. 6, therein is shown a flow chart of an anti-hacking system 600 of a memory lock system, such as the memory lock system 300 of FIG. 3, in accordance with a fourth embodiment of the present invention. The anti-hacking system 600 would be stored in a controller, for example the micro-controller 212 of FIG. 2.

The unit is powered up in a block 602 and the program progresses to setting the input attempts=0 in a block 604.

The user inputs a combination sequence in a block 606. The program then progresses to a decision block 608 to determine if the input attempts are greater than a certain number x. If the number of attempts that the user has made to input the combination sequence is under x, the program progresses to a decision block 610 to determine if the combination is correct. If "yes", the program progresses to an unlock memory device block 612 to allow access to the memory 216 of FIG. 2.

If the combination is not correct in the decision block 610, the program proceeds to increment the input attempts in input attempts=input attempts+1 in a block 614. The program then progresses to cause the indicator 210 of FIG. 2 to light up in an indicate block 616. The program then returns to the user to input the combination sequence in the block 606. When the program reaches the decision block 608 and the number of attempts exceeds x, the program proceeds to stop at a block 618 or may transition to 616. In this manner, no indication is given to the potential hacker causing more frustration resulting in them giving up.

The above assures that the user may only input a certain number of times before the system shuts down.

The device will again regain operation when:
 a) The system of the present invention wakes from sleep mode (battery powered).
 b) The system of the present invention is removed and reconnected to USB port (battery-less).

The anti-hacking system 600 is structured such that, when X attempts have been made at unlocking, the unit will respond as if a correct combination fails also. When the device is disconnected from its power source or re-awakes from sleep mode, Input Attempts in the block 604 is reset to 0 and the device can then again function as normal.

Figure 7:
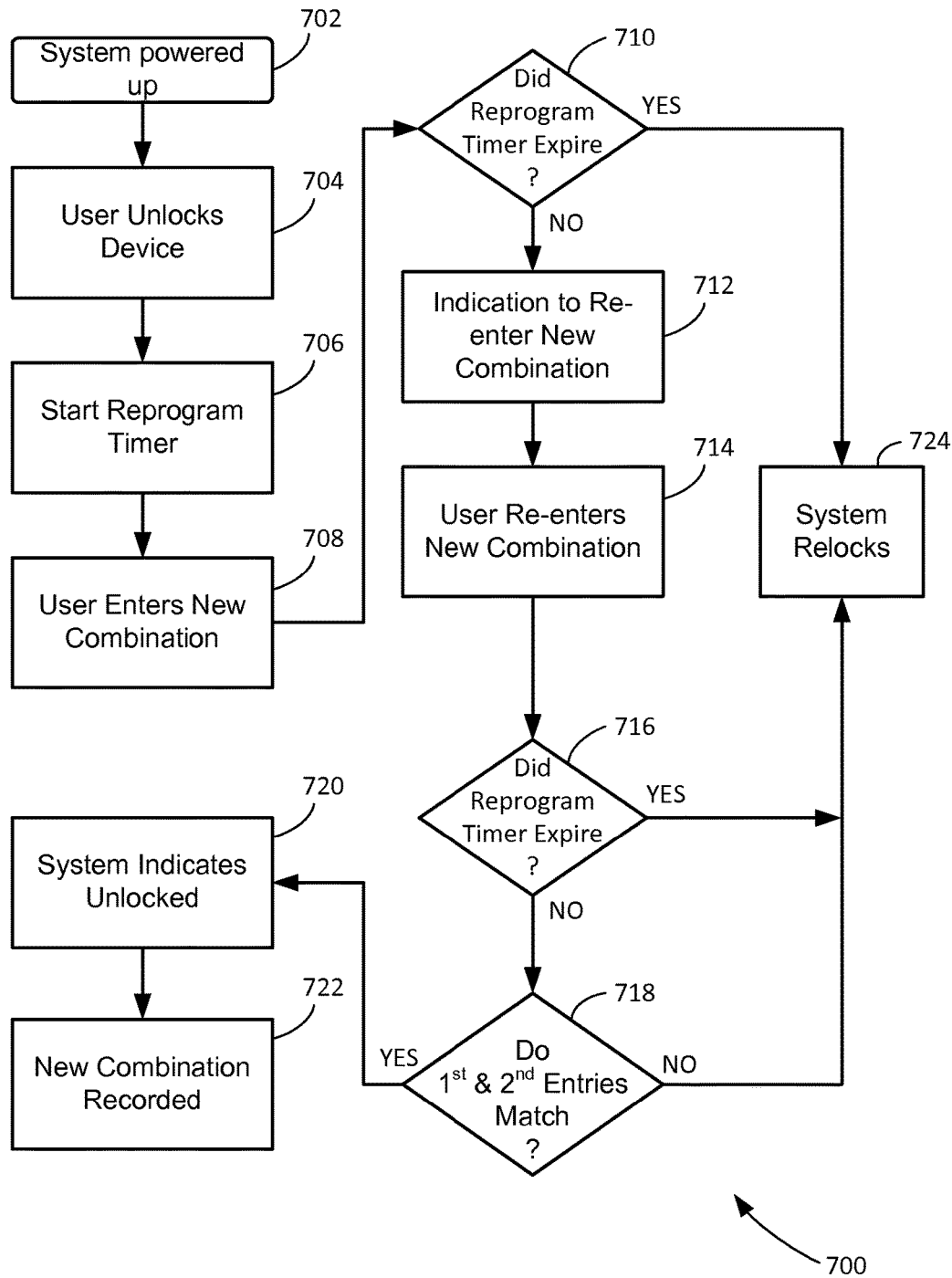
FIG. 7 is a flow chart of a combination reconfiguring system for a memory lock system in accordance with a fifth embodiment of the present invention.

Referring now to FIG. 7, therein is shown a flow chart of a combination reconfiguring system 700 for the memory lock system 200 of FIG. 2 in accordance with a fifth embodiment of the present invention. In the present invention, a new combination must be entered and verified within a short window of opportunity.

The memory lock system 200 is powered up in a block 702, and the user unlocks the memory lock system 200 in a block 704 using a first combination that was previously in the memory lock system 200 from the factory or previously entered by the user. As soon as the unlock occurs, the program starts a timer in start reprogram timer block 706. This is to prevent unattended and unlocked devices from being stolen and reconfigured.

The user must then enter the new combination in a block 708. If the reprogram timer did not expire in a decision block 710, the program moves to show that the memory lock system 200 is receptive to the entry of a new combination by providing an indication to re-enter the new combination in a block 712. The indication can be by an audio, visual, or tactile signal. The user re-enters the new combination in a block 714 to double check the new combination.

A check is made to see if the new combination was entered in time in a reprogram timer expired decision block 716. If "yes", the program proceeds to do a compare in a first and second new combinations match decision block 718. If "yes", the memory lock system 200 indicates that it is unlocked in a block 720 and the new combination is recorded in a box 722.

If the reprogram timer expired in the decision block 710 or 716, the program will proceed to relock the system in a block 724. Finally, if the first and second new combinations do not match, the program proceeds to relock the memory lock system 200 in the system relock in the block 724.

Of course, there are several variations how a memory lock system is designed and built:
 (1) it can be pre-set at the factory (and cannot be reprogrammed);
 (2) it can be designed to allow user to reconfigure the combination once the unit unlocked (within a short window of opportunity); or
 (3) it can be designed to allow remote reconfiguration in case if someone forgotten their combination (once it is determined that this person is an authorized/legitimate person).

In a further embodiment of the combination reconfiguring to reset the memory lock system:
 (1) it is delivered with a preconfigured combination, which must be used in order to unlock the device for the first time;
 (2) a reset button on the memory lock system is pressed. A LED will flash to indicate that the system is ready to accept a new combination;
 (3) a new combination is entered and the reset button is pressed again; and
 (4) if a mistake is made during entry, the memory lock system from is unplugged from the USB port and restarted using the original combination; or
 (5) the reset button is pushed again when the entry is satisfactory. The combination has now been changed.

Figure 8:
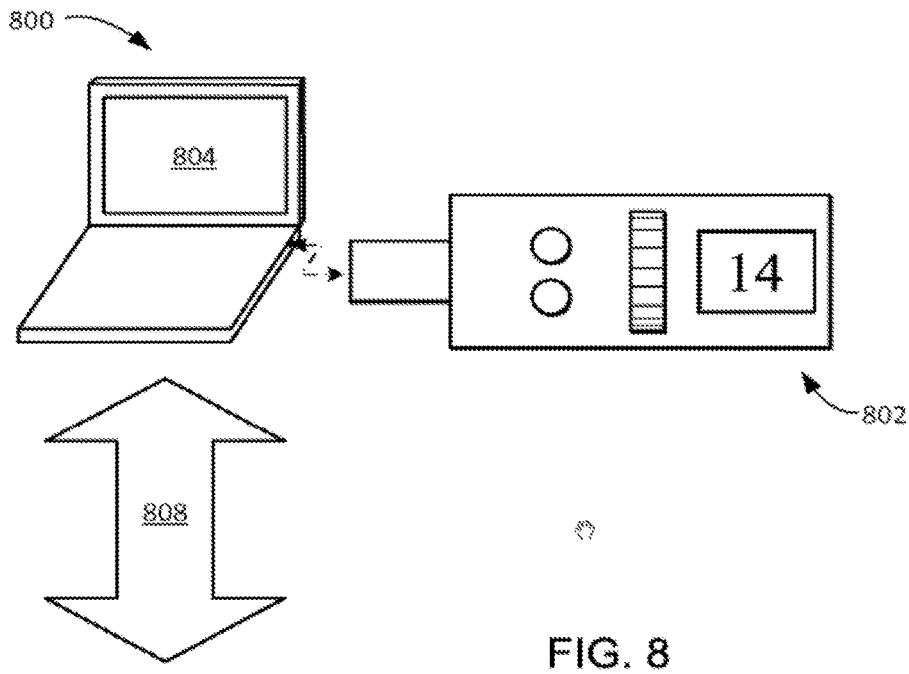
FIG. 8 is a two-factor authentication system using a memory lock system as a secure token in accordance with a sixth embodiment of the present invention.
Figure 8:
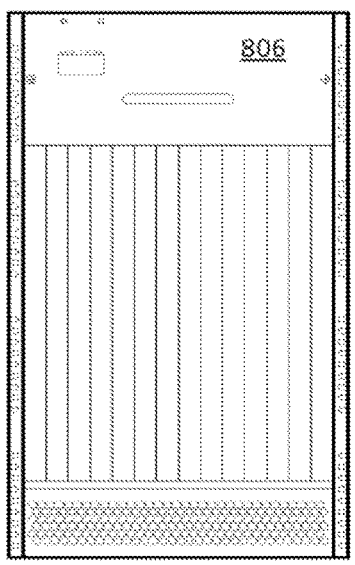

Referring now to FIG. 8, therein is shown a two-factor authentication system 800 using a memory lock system 802 as a secure token in accordance with a sixth embodiment of the present invention.

It understood that appearance-wise, the memory lock system 802 could be implemented in many different forms/shapes and combined with different known products (for example, key ring USB Flash drives, digital USB/watches, music players, portable memory devices, camcorders, laptops, smart phones, palm computers, etc.).

The two-factor authentication system 800 further includes a customer computer 804 capable of being connected to a financial institution host computer 806 by a connection 808, such as a telephone line, Internet connection, etc.

Financial institutions are currently trying to implement two-factor authentication systems, which require two separate factors for identification to reduce identity theft and unauthorized access to financial accounts. For example in an ideal system, both a fingerprint and an eye print have to be provided before access is given to a financial account.

Current approaches to two-factor authentication systems include:
 a) Card readers are devices that detect correct authorization based on information stored on a card held in an individual's possession.
 b) Tokens are key-sized devices that plug into a computer's USB port and are used with a password to exchange information with the financial site.
 c) Password generators where tokens or other devices are used to create one-time passwords (OTPs) and the OTPs change dynamically after each use.

All current devices suffer from the same shortcoming in that they can be lost or stolen and the subsequent possessor can access the financial accounts.

For the two-factor authentication system 800 to work, it has to comply with the following rules:
 1. A locked token (the memory lock system 802) cannot exchange information with the financial institution host computer 806.
 2. Once the token (the memory lock system 802) is removed from the customer computer, it relocks.
 3. The token (the memory lock system 802) generates a new authentication code each time the customer account is accessed via currently employed methods used for unsecured tokens on the market.
 4. Optionally a login and password can be entered (although this becomes unnecessary because the memory lock system 802 will not function unless the correct combination has been entered).

The two-factor authentication system 800 will increase security and simplify customer experience at the same time.

In operation, the user connects the memory lock system 802 to the customer computer 804 and unlocks the memory lock system 802 using the user's combination. The memory lock system 802 provides the first factor for two-factor authentication and the user's combination provides the second factor, which allows access to information in the memory lock system memory that the financial institution will recognize.

The user then accesses the financial institution host computer 806 by the connection 808, such as the Internet. The financial institution recognizes the information and allows access.

Figure 9:
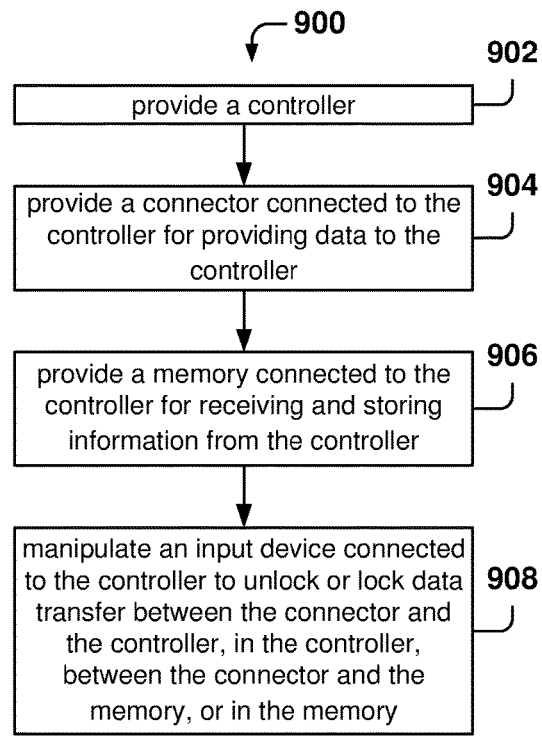
FIG. 9 is a flow chart for a memory lock system.

Referring now to FIG. 9, therein is shown flow chart for a memory lock system 900, which includes: providing a controller in a block 902; providing a connector connected to the controller for providing data to the controller in a block 904; providing a memory connected to the controller for receiving and storing information from the controller in a block 906; and manipulating an input device connected to the controller to unlock or lock data transfer between the connector and the controller, in the controller, between the connector and the memory, or in the memory in a block 908.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an authentication system comprising:
    maintaining a memory lock system invisible to a computer, attached to the memory lock system, until the memory lock system is in an unlocked status, the memory lock system including a body, the body comprising an electronic connector, a controller, a memory that is internal within the body, and an input device manipulatable by a user, wherein maintaining the memory lock system invisible comprises locking a first channel and a second channel, the first channel between the controller and the memory and the second channel between the controller and the electronic connector, wherein the memory cannot be written to or read from while the memory lock system is locked;
    receiving an input at the input device of the memory lock system, the memory being in a locked status until a correct login credential is received via the input device;
    checking, by the controller in the body of the memory lock system, the received input for a login credential to unlock the memory lock system;
    setting the memory of the memory lock system to the unlocked status based on the check for the login credential, the setting the memory lock system to the unlocked status comprising unlocking the first channel and the second channel; and
    enabling, when the memory of the memory lock system is in the unlocked status, a communication channel between the electronic connector in the memory lock system and the computer for transferring data between the memory lock system and the computer.

2. The method as claimed in claim 1 further comprising:
    detecting a termination of the communication channel; and
    setting the memory to the locked status based on the termination.

3. The method as claimed in claim 1, further comprising:
    providing two-factor authentication, wherein providing the two-factor authentication includes:
        enabling a connection between the computer and a financial institution system while the memory is in the unlocked status; and
        disabling the connection between the computer and the financial institution system while the memory is in the locked status.

4. The method as claimed in claim 1 wherein setting the memory to the unlocked status includes unlocking the first channel and the second channel to enable a data transfer function between the electronic connector of the memory lock system and the memory.

5. The method as claimed in claim 1, further comprising:
    providing two-factor authentication for accessing an account in a financial institution system, the correct login credential being a first factor of the two-factor authentication, the memory lock system being a physical component that is a secure token used as a second factor of the two-factor authentication;
    allowing access by the financial institution system to information in the memory lock system based on the memory lock system being the physical component and the correct login credential;
    recognizing, by the financial institution, the information in the memory lock system; and
    allowing, by the financial institution, access to the account in the financial institution system based on the recognizing.

6. The method as claimed in claim 1, wherein the controller controls a first control switch for locking the first channel and a second control switch for locking the second channel.

7. A method of operation of an authentication system comprising:
    maintaining a memory lock system invisible to a computer, attached to the memory lock system, until the memory lock system is in an unlocked status, the memory lock system including a body, the body comprising an electronic connector, a controller, a memory that is internal within the body, and a wireless connector, wherein maintaining the memory lock system invisible comprises locking a first channel and a second channel, the first channel between the controller and the memory and the second channel between the controller and the electronic connector, wherein the memory cannot be written to or read from while the memory lock system is locked;
    receiving an input through the wireless connector at the memory lock system, the memory being in a locked status until a correct login credential is received;
    checking, by the controller in the body of the memory lock system, the received input for a login credential to unlock the memory lock system;
    setting the memory of the memory lock system to the unlocked status based on the check for the login credential, the setting the memory lock system to the unlocked status comprising unlocking the first channel and the second channel;
    enabling, when the memory of the memory lock system is in the unlocked status, a communication channel from the electronic connector in the memory lock system and the computer for transferring data between the memory lock system and a financial institution system via the computer;
    providing two-factor authentication for accessing an account in the financial institution system, the correct login credential being a first factor of the two-factor authentication, the memory lock system being a physical component that is a secure token used as a second factor of the two-factor authentication;

allowing access by the financial institution system to information in the memory lock system based on the memory lock system being the physical component and the correct login credential;

recognizing, by the financial institution, the information in the memory lock system; and allowing, by the financial institution, access to the account on the financial institution system based on the recognizing.

8. The method as claimed in claim 7 wherein the two-factor authentication further comprises:

generating a one-time password from a password generator of the memory lock system, a software application, or a combination thereof; and sending the one-time password to the financial institution system.

9. The method as claimed in claim 7 further comprising:

generating a new login credential each time the account on the financial institution system is accessed.

10. The method as claimed in claim 7 further comprising:

decrypting, at the memory lock system, data in the memory before sending the data from the memory to the financial institution system.

11. A memory lock system comprising:

a body comprising:

a memory for storing authentication information;

an input device for receiving a login credential, the input device being manipulatable by a user for entering the login credential;

an electronic connector for coupling to a computer;

a controller for controlling a communication channel from the electronic connector in the memory lock system to the computer;

a first channel between the controller and the memory;

a second channel between the controller and the electronic connector, a locking function controller for setting an unlocked status to the memory of the memory lock system based on the login credential, the memory being in a locked status until a correct login credential is received via the input device, wherein the first channel and the second channel are disabled when the memory is in the locked status, wherein the memory lock system is invisible to the computer, when attached to the memory lock system, until the memory lock system is in the unlocked status; and a transfer function controller for providing the authentication information for accessing an account.

12. The memory lock system as claimed in claim 11 wherein:

the transfer function controller is for detecting a termination of the communication channel; and the locking function controller is for setting the memory to the locked status based on the termination.

13. The memory lock system as claimed in claim 11 wherein the transfer function controller is for enabling a connection between the computer and a financial institution system while the memory is in the unlocked status and disabling the connection between the computer and the financial institution system while the memory is in the locked status.

14. The memory lock system as claimed in claim 11 wherein the transfer function controller is for enabling a data transfer function between a connector of the memory lock system and the memory.

15. The memory lock system as claimed in claim 11 wherein:

the transfer function controller is for sending the authentication information from the memory to a financial institution system; and the locking function controller is for enabling the access to the account in the financial institution system.

16. The memory lock system as claimed in claim 15 wherein the authentication information includes a generated one-time password from a password generator of the memory lock system, a software application, or a combination thereof.

17. The memory lock system as claimed in claim 15 wherein the transfer function controller is for generating a new login credential each time the account on the financial institution system is accessed.

18. The memory lock system as claimed in claim 15 wherein the input device is configured for receiving, through a wired or wireless connection, a fingerprint, a password, a combination, an eye print, a manipulatable input, a voice print, a face print, or a combination thereof.

19. The memory lock system as claimed in claim 15 wherein the transfer function controller is for decrypting, at the memory lock system, data in the memory before sending the data from the memory to the financial institution system.

20. The memory lock system as claimed in claim 11, wherein the instructions further cause the one or more computer processors to perform operations comprising:

providing two-factor authentication for accessing an account in a financial institution system, the correct login credential being a first factor of the two-factor authentication, the memory lock system being a physical component that is a secure token used as a second factor of the two-factor authentication;

allowing access by the financial institution system to information in the memory lock system based on the memory lock system being the physical component and the correct login credential;

recognizing, by the financial institution, the information in the memory lock system; and allowing, by the financial institution, access to the account in the financial institution system based on the recognizing.

21. The memory lock system as claimed in claim 11, further comprising:

a first control switch for locking the first channel; and a second control switch for locking the second channel.

* * * * *

UNITED STATES PATENT AND TRADEMARK OFFICE
CERTIFICATE OF CORRECTION

PATENT NO. : 10,503,665 B2
APPLICATION NO. : 14/719185
DATED : December 10, 2019
INVENTOR(S) : Bolotin et al.

Page 1 of 1

It is certified that error appears in the above-identified patent and that said Letters Patent is hereby corrected as shown below:

In the Specification

In Column 11, Line 25, delete "SI," and insert --5I,-- therefor

In Column 11, Line 29, delete "5061," and insert --506I,-- therefor

In Column 11, Line 30, delete "5081" and insert --508I-- therefor

In Column 11, Line 32, delete "5101" and insert --510I-- therefor

Signed and Sealed this
Fifth Day of May, 2020

Andrei Iancu
*Director of the United States Patent and Trademark Office*